US012672135B2

(12) United States Patent
Liu

(10) Patent No.: US 12,672,135 B2
(45) Date of Patent: Jun. 30, 2026

(54) CONFIGURATION INFORMATION SENDING METHOD AND APPARATUS, AND REDUNDANCY VERSION RV VALUE DETERMINING METHOD AND APPARATUS

(71) Applicant: Beijing Xiaomi Mobile Software Co., Ltd., Beijing (CN)

(72) Inventor: Yang Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 296 days.

(21) Appl. No.: 18/558,873

(22) PCT Filed: May 10, 2021

(86) PCT No.: PCT/CN2021/092846
§ 371 (c)(1),
(2) Date: Nov. 3, 2023

(87) PCT Pub. No.: WO2022/236604
PCT Pub. Date: Nov. 17, 2022

(65) Prior Publication Data
US 2024/0244615 A1 Jul. 18, 2024

(51) Int. Cl.
*H04W 72/12* (2023.01)
*H04L 1/08* (2006.01)
*H04W 72/1268* (2023.01)

(52) U.S. Cl.
CPC ........... *H04W 72/1268* (2013.01); *H04L 1/08* (2013.01)

(58) Field of Classification Search
None
See application file for complete search history.

(56) References Cited

U.S. PATENT DOCUMENTS

2020/0106559 A1    4/2020  Vilaipornsawai et al.
2021/0160879 A1*   5/2021  Lin ................... H04W 72/0453
(Continued)

FOREIGN PATENT DOCUMENTS

CN      111901888 A    11/2020
CN      112715011 A    4/2021
(Continued)

OTHER PUBLICATIONS

"Views on PDCCH, PUCCH, and PUSCH Enhancements for M-TRP", InterDigital, Inc., 3GPP TSG RAN WG1 #104b-e, R1-2102433, e-Meeting, Apr. 12-20, 2021, 9 pages.
(Continued)

*Primary Examiner* — Kodzovi Acolatse
(74) *Attorney, Agent, or Firm* — Finnegan, Henderson, Farabow, Garrett & Dunner, L.L.P.

(57) ABSTRACT

A method for sending configuration information is performed by a base station, wherein the base station is provided with a plurality of Transmission and Reception Points (TRPs) for receiving a Configured Grant Physical Uplink Shared Channel (CG PUSCH). The method includes: sending configuration information to a terminal, wherein the configuration information is configured to determine a respective Redundancy Version (RV) value for each of transmission occasions in response to the terminal sending a same Transport Block (TB) repeatedly on the transmission occasions towards different directions of TRPs, and the transmission occasions belong to one or more CG PUSCH configurations.

20 Claims, 18 Drawing Sheets

(56) References Cited

U.S. PATENT DOCUMENTS

| | | | | |
|---|---|---|---|---|
| 2022/0022233 A1* | 1/2022 | Lee | H04L 1/0031 |
| 2022/0287021 A1* | 9/2022 | Gao | H04L 1/1896 |
| 2023/0171769 A1* | 6/2023 | Chen | H04L 1/1864 |
| | | | 370/329 |

FOREIGN PATENT DOCUMENTS

| | | | |
|---|---|---|---|
| EP | 3809602 A1 | 4/2021 |
| WO | WO 2020/044409 A1 | 3/2020 |
| WO | WO 2020/054693 A1 | 3/2020 |
| WO | WO 2020/066021 A1 | 4/2020 |
| WO | WO 2021/070307 A1 | 4/2021 |

OTHER PUBLICATIONS

"Enhancements for Multi-TRP URLLC schemes", Nokia, Nokia Shanghai Bell, 3GPP TSG RAN WG1 #104-bis-e Meeting, R1-2103366, e-Meeting, Apr. 12-20, 2021, 29 pages.

"Considerations on multi-TRP/panel transmission", Catt, 3GPP TSG-RAN WG1 #98bis, R1-1910349, Chongquing, China, Oct. 14-20, 2019, 27 pages.

"Discussion on unlicensed band URLLC/1IoT", ZTE, 3GPP TSG RAN WG1 Meeting #102-e, R1-2005433, e- Meeting, Aug. 17, 19, 2020, 7 pages.

Partial Supplementary European Search Report Issued in Application No. 21941180.8 dated Jul. 2, 2024, 16 pages.

Notice of Reasons for Refusal issued by the Japanese Patent Office on Sep. 2, 2024, in corresponding Application No. JP 2023-568689, 7 pages.

Office Action issued by the Patent Office of the Russian Federation Federal Institute of Industrial Property on Mar. 27, 2024, in corresponding Application No. RU 2023131559/07, 8 pages.

The First Office Action issued by the State Intellectual Property Office of People's Republic of China on Mar. 3, 2025, in corresponding Application No. CN 202280001432.2, 14 pages.

International Search Report and Written Opinion of International Application No. PCT/CN2021/092846, dated Jan. 27, 2022, 14 pages.

* cited by examiner

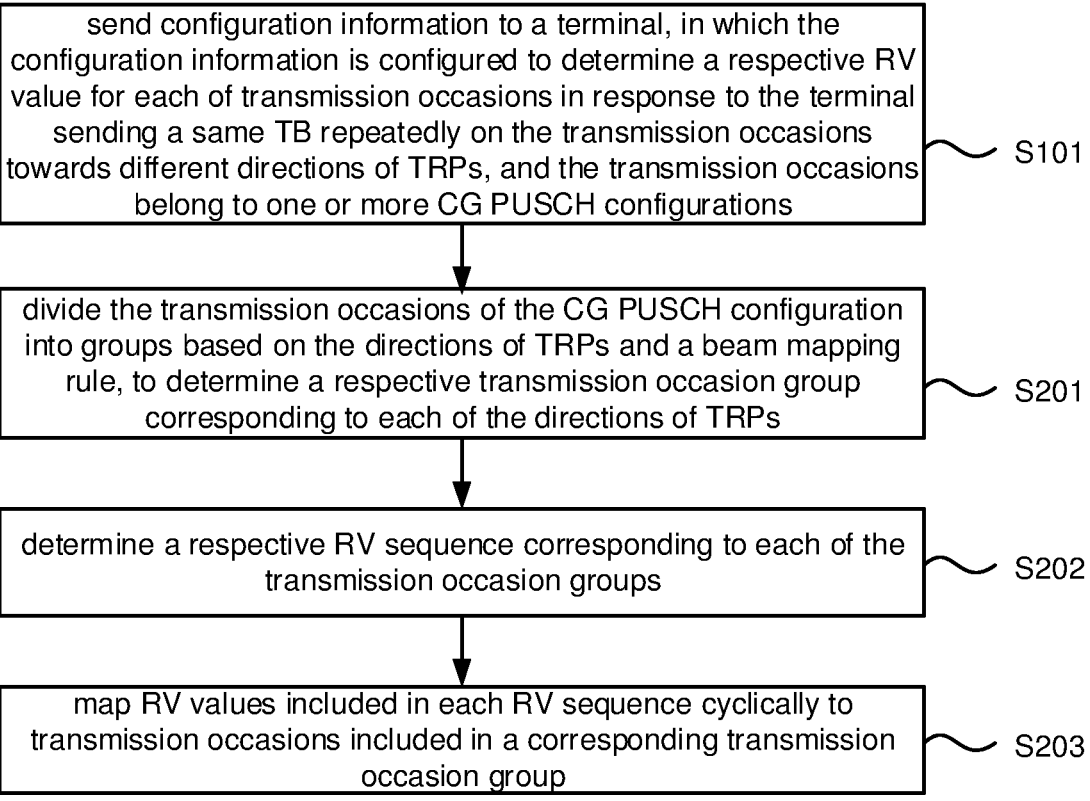

send configuration information to a terminal, in which the configuration information is configured to determine a respective RV value for each of transmission occasions in response to the terminal sending a same TB repeatedly on the transmission occasions towards different directions of TRPs, and the transmission occasions belong to one or more CG PUSCH configurations — S101

FIG. 1 send configuration information to a terminal, in which the configuration information is configured to determine a respective RV value for each of transmission occasions in response to the terminal sending a same TB repeatedly on the transmission occasions towards different directions of TRPs, and the transmission occasions belong to one or more CG PUSCH configurations — S101 divide the transmission occasions of the CG PUSCH configuration into groups based on the directions of TRPs and a beam mapping rule, to determine a respective transmission occasion group corresponding to each of the directions of TRPs — S201 determine a respective RV sequence corresponding to each of the transmission occasion groups — S202 map RV values included in each RV sequence cyclically to transmission occasions included in a corresponding transmission occasion group — S203

FIG. 2

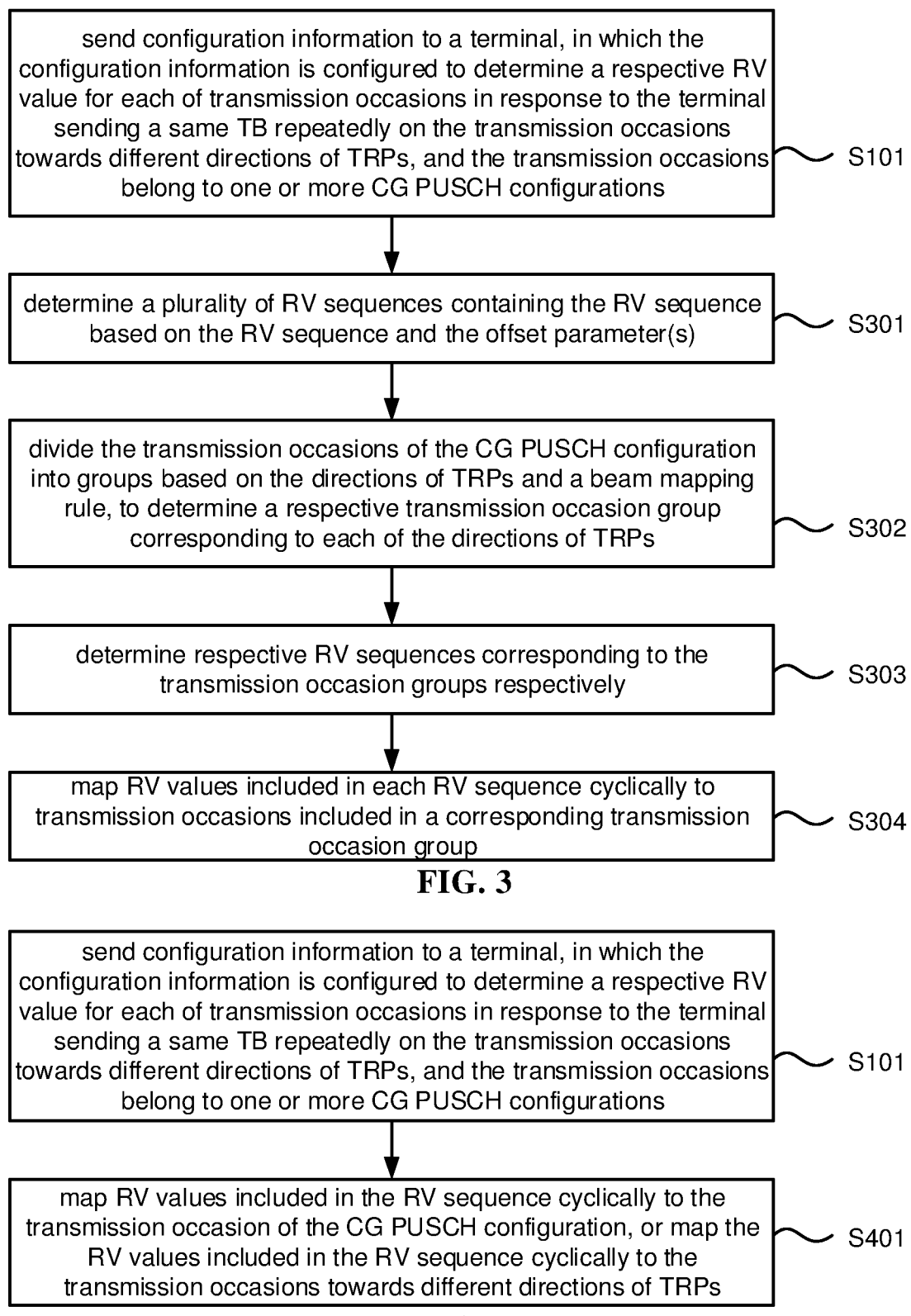

send configuration information to a terminal, in which the configuration information is configured to determine a respective RV value for each of transmission occasions in response to the terminal sending a same TB repeatedly on the transmission occasions towards different directions of TRPs, and the transmission occasions belong to one or more CG PUSCH configurations ~ S101 determine a plurality of RV sequences containing the RV sequence based on the RV sequence and the offset parameter(s) ~ S301 divide the transmission occasions of the CG PUSCH configuration into groups based on the directions of TRPs and a beam mapping rule, to determine a respective transmission occasion group corresponding to each of the directions of TRPs ~ S302 determine respective RV sequences corresponding to the transmission occasion groups respectively ~ S303 map RV values included in each RV sequence cyclically to transmission occasions included in a corresponding transmission occasion group ~ S304

FIG. 3 send configuration information to a terminal, in which the configuration information is configured to determine a respective RV value for each of transmission occasions in response to the terminal sending a same TB repeatedly on the transmission occasions towards different directions of TRPs, and the transmission occasions belong to one or more CG PUSCH configurations ~ S101 map RV values included in the RV sequence cyclically to the transmission occasion of the CG PUSCH configuration, or map the RV values included in the RV sequence cyclically to the transmission occasions towards different directions of TRPs ~ S401

FIG. 4

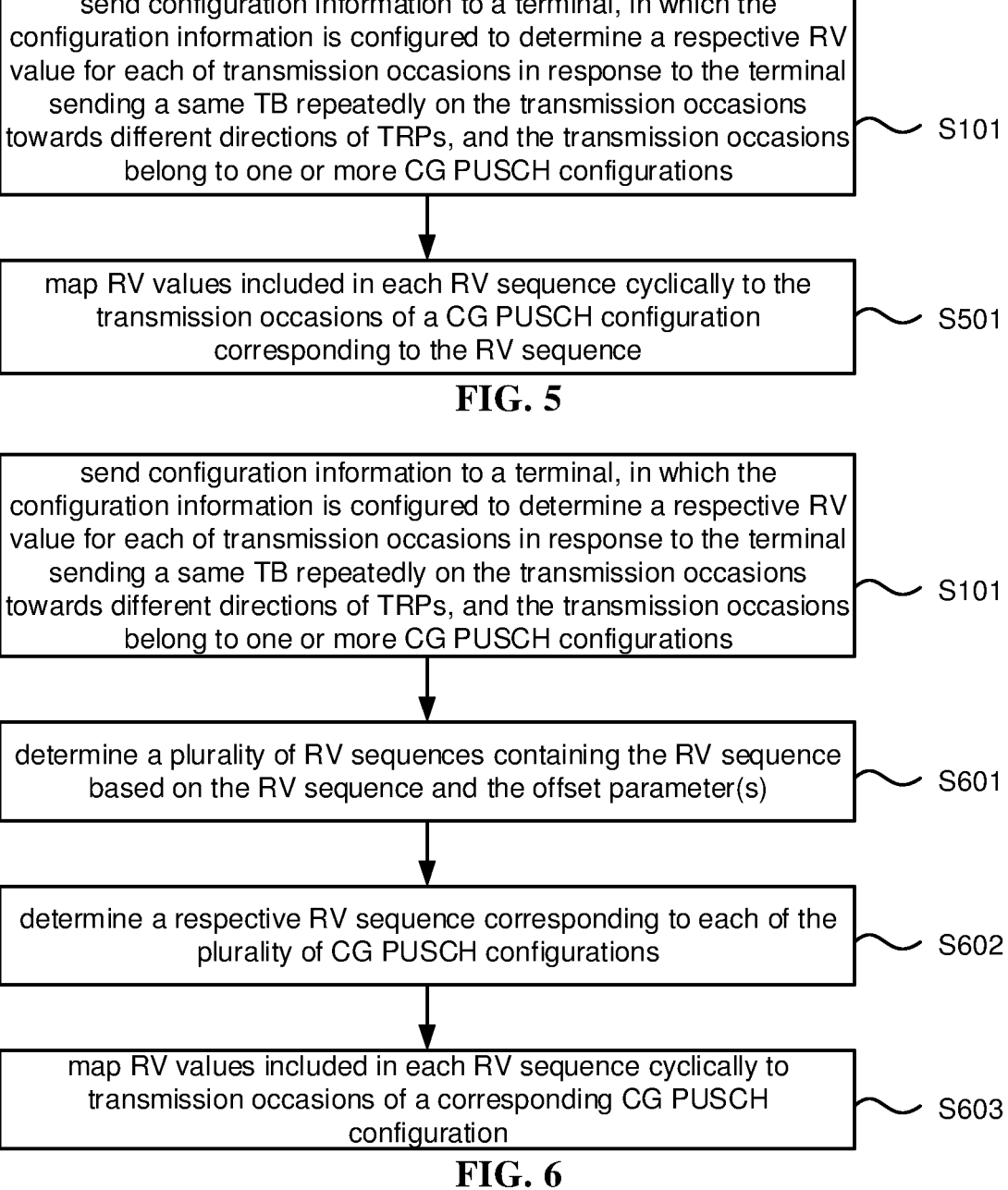

send configuration information to a terminal, in which the configuration information is configured to determine a respective RV value for each of transmission occasions in response to the terminal sending a same TB repeatedly on the transmission occasions towards different directions of TRPs, and the transmission occasions belong to one or more CG PUSCH configurations ⟿ S101 map RV values included in each RV sequence cyclically to the transmission occasions of a CG PUSCH configuration corresponding to the RV sequence ⟿ S501

FIG. 5 send configuration information to a terminal, in which the configuration information is configured to determine a respective RV value for each of transmission occasions in response to the terminal sending a same TB repeatedly on the transmission occasions towards different directions of TRPs, and the transmission occasions belong to one or more CG PUSCH configurations ⟿ S101 determine a plurality of RV sequences containing the RV sequence based on the RV sequence and the offset parameter(s) ⟿ S601 determine a respective RV sequence corresponding to each of the plurality of CG PUSCH configurations ⟿ S602 map RV values included in each RV sequence cyclically to transmission occasions of a corresponding CG PUSCH configuration ⟿ S603

FIG. 6

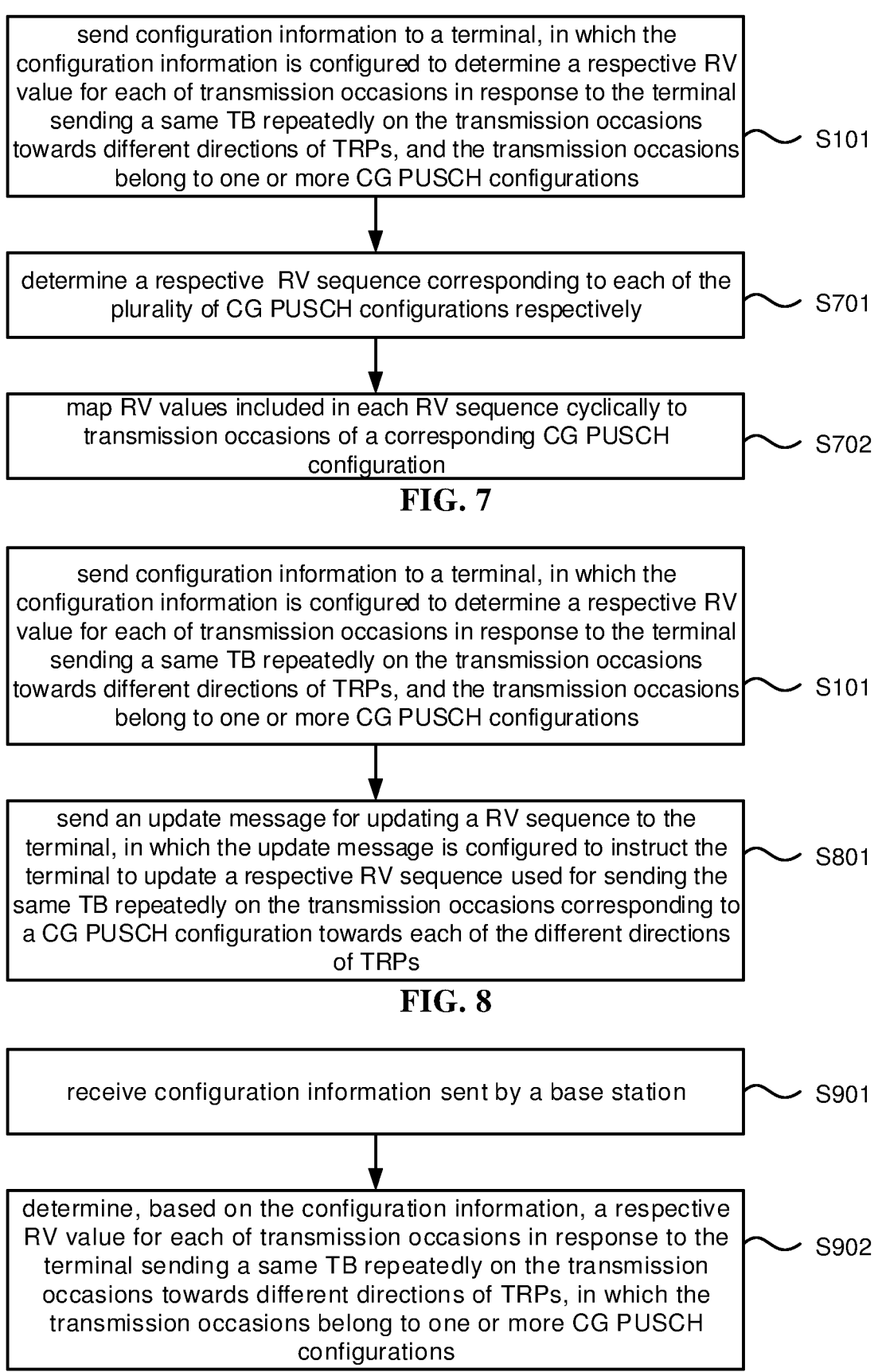

send configuration information to a terminal, in which the configuration information is configured to determine a respective RV value for each of transmission occasions in response to the terminal sending a same TB repeatedly on the transmission occasions towards different directions of TRPs, and the transmission occasions belong to one or more CG PUSCH configurations  ~ S101 determine a respective RV sequence corresponding to each of the plurality of CG PUSCH configurations respectively  ~ S701 map RV values included in each RV sequence cyclically to transmission occasions of a corresponding CG PUSCH configuration  ~ S702

FIG. 7 send configuration information to a terminal, in which the configuration information is configured to determine a respective RV value for each of transmission occasions in response to the terminal sending a same TB repeatedly on the transmission occasions towards different directions of TRPs, and the transmission occasions belong to one or more CG PUSCH configurations  ~ S101 send an update message for updating a RV sequence to the terminal, in which the update message is configured to instruct the terminal to update a respective RV sequence used for sending the same TB repeatedly on the transmission occasions corresponding to a CG PUSCH configuration towards each of the different directions of TRPs  ~ S801

FIG. 8 receive configuration information sent by a base station  ~ S901 determine, based on the configuration information, a respective RV value for each of transmission occasions in response to the terminal sending a same TB repeatedly on the transmission occasions towards different directions of TRPs, in which the transmission occasions belong to one or more CG PUSCH configurations  ~ S902

FIG. 9

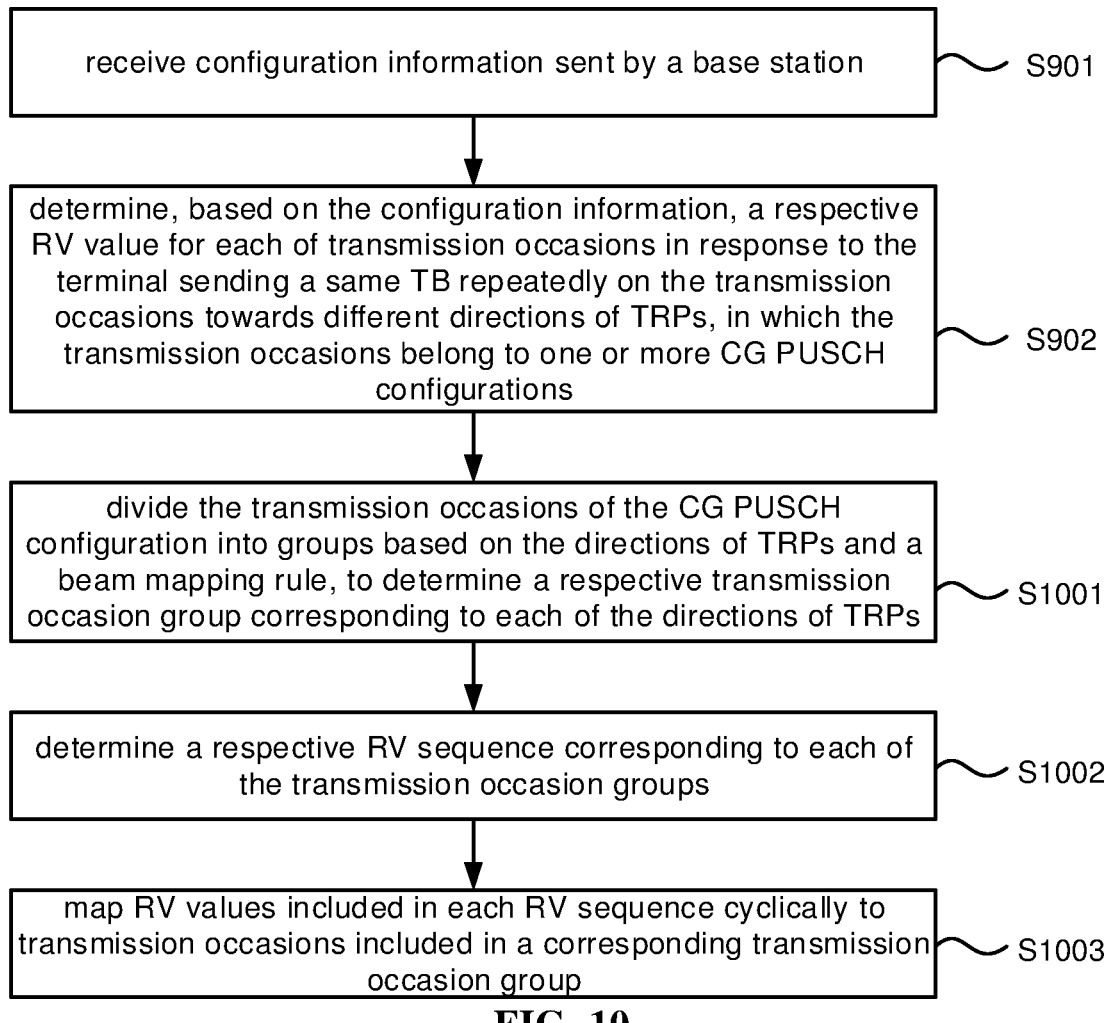

receive configuration information sent by a base station ⟶ S901 determine, based on the configuration information, a respective RV value for each of transmission occasions in response to the terminal sending a same TB repeatedly on the transmission occasions towards different directions of TRPs, in which the transmission occasions belong to one or more CG PUSCH configurations ⟶ S902 divide the transmission occasions of the CG PUSCH configuration into groups based on the directions of TRPs and a beam mapping rule, to determine a respective transmission occasion group corresponding to each of the directions of TRPs ⟶ S1001 determine a respective RV sequence corresponding to each of the transmission occasion groups ⟶ S1002 map RV values included in each RV sequence cyclically to transmission occasions included in a corresponding transmission occasion group ⟶ S1003

FIG. 10

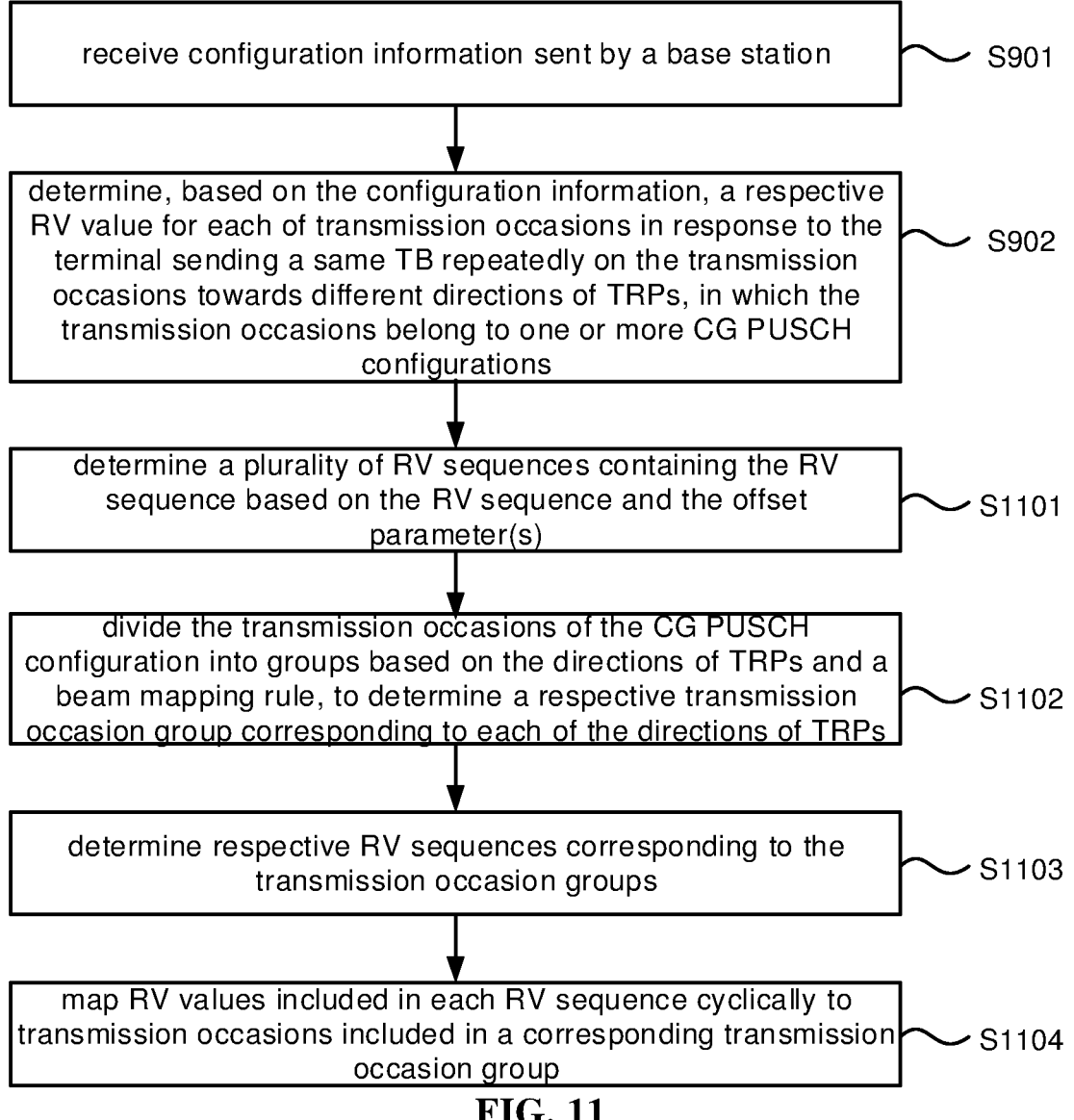

receive configuration information sent by a base station    S901 determine, based on the configuration information, a respective RV value for each of transmission occasions in response to the terminal sending a same TB repeatedly on the transmission occasions towards different directions of TRPs, in which the transmission occasions belong to one or more CG PUSCH configurations    S902 determine a plurality of RV sequences containing the RV sequence based on the RV sequence and the offset parameter(s)    S1101 divide the transmission occasions of the CG PUSCH configuration into groups based on the directions of TRPs and a beam mapping rule, to determine a respective transmission occasion group corresponding to each of the directions of TRPs    S1102 determine respective RV sequences corresponding to the transmission occasion groups    S1103 map RV values included in each RV sequence cyclically to transmission occasions included in a corresponding transmission occasion group    S1104

FIG. 11

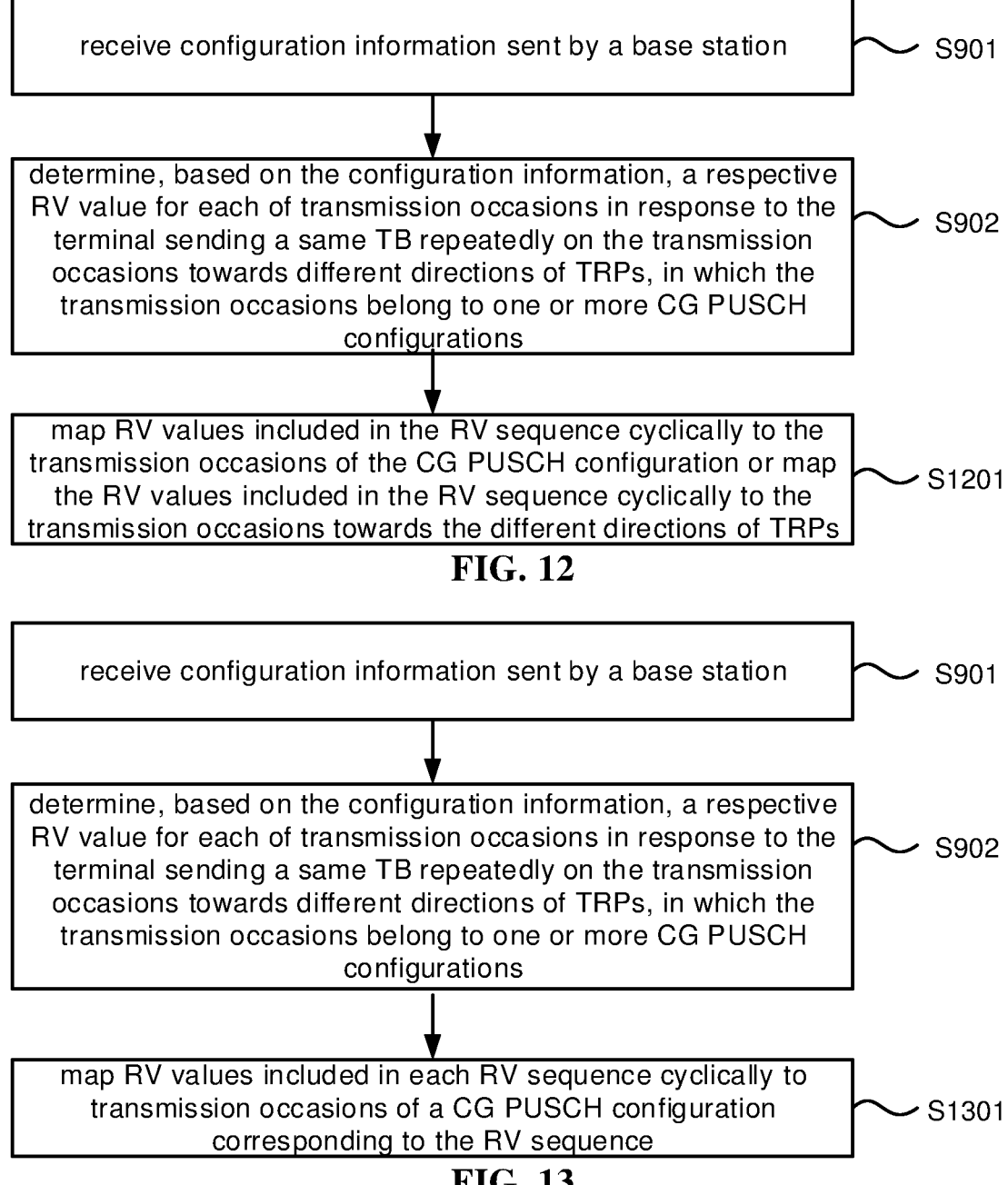

| receive configuration information sent by a base station | S901 | determine, based on the configuration information, a respective RV value for each of transmission occasions in response to the terminal sending a same TB repeatedly on the transmission occasions towards different directions of TRPs, in which the transmission occasions belong to one or more CG PUSCH configurations — S902 map RV values included in the RV sequence cyclically to the transmission occasions of the CG PUSCH configuration or map the RV values included in the RV sequence cyclically to the transmission occasions towards the different directions of TRPs — S1201

FIG. 12 receive configuration information sent by a base station — S901 determine, based on the configuration information, a respective RV value for each of transmission occasions in response to the terminal sending a same TB repeatedly on the transmission occasions towards different directions of TRPs, in which the transmission occasions belong to one or more CG PUSCH configurations — S902 map RV values included in each RV sequence cyclically to transmission occasions of a CG PUSCH configuration corresponding to the RV sequence — S1301

FIG. 13

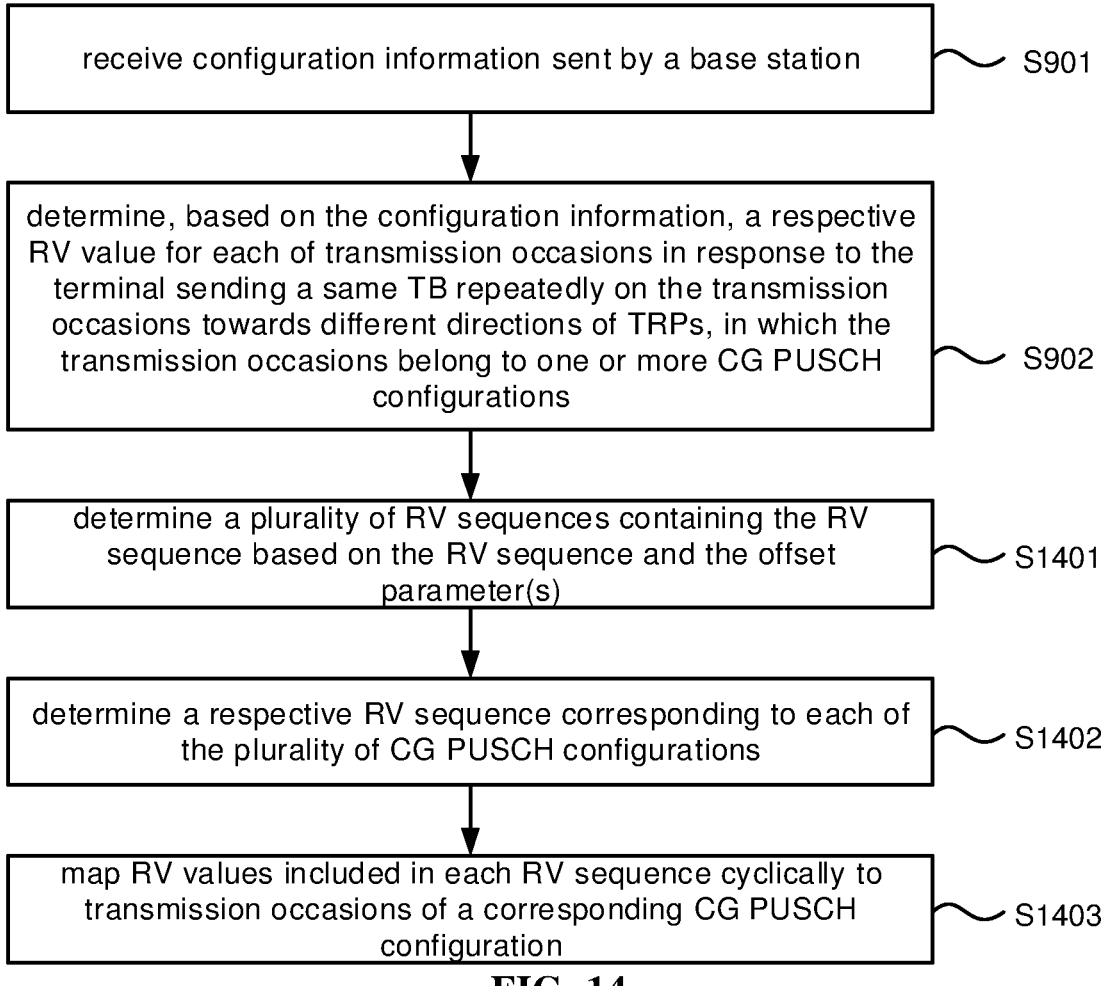

receive configuration information sent by a base station        ᔕ S901 determine, based on the configuration information, a respective RV value for each of transmission occasions in response to the terminal sending a same TB repeatedly on the transmission occasions towards different directions of TRPs, in which the transmission occasions belong to one or more CG PUSCH configurations        ᔕ S902 determine a plurality of RV sequences containing the RV sequence based on the RV sequence and the offset parameter(s)        ᔕ S1401 determine a respective RV sequence corresponding to each of the plurality of CG PUSCH configurations        ᔕ S1402 map RV values included in each RV sequence cyclically to transmission occasions of a corresponding CG PUSCH configuration        ᔕ S1403

FIG. 14

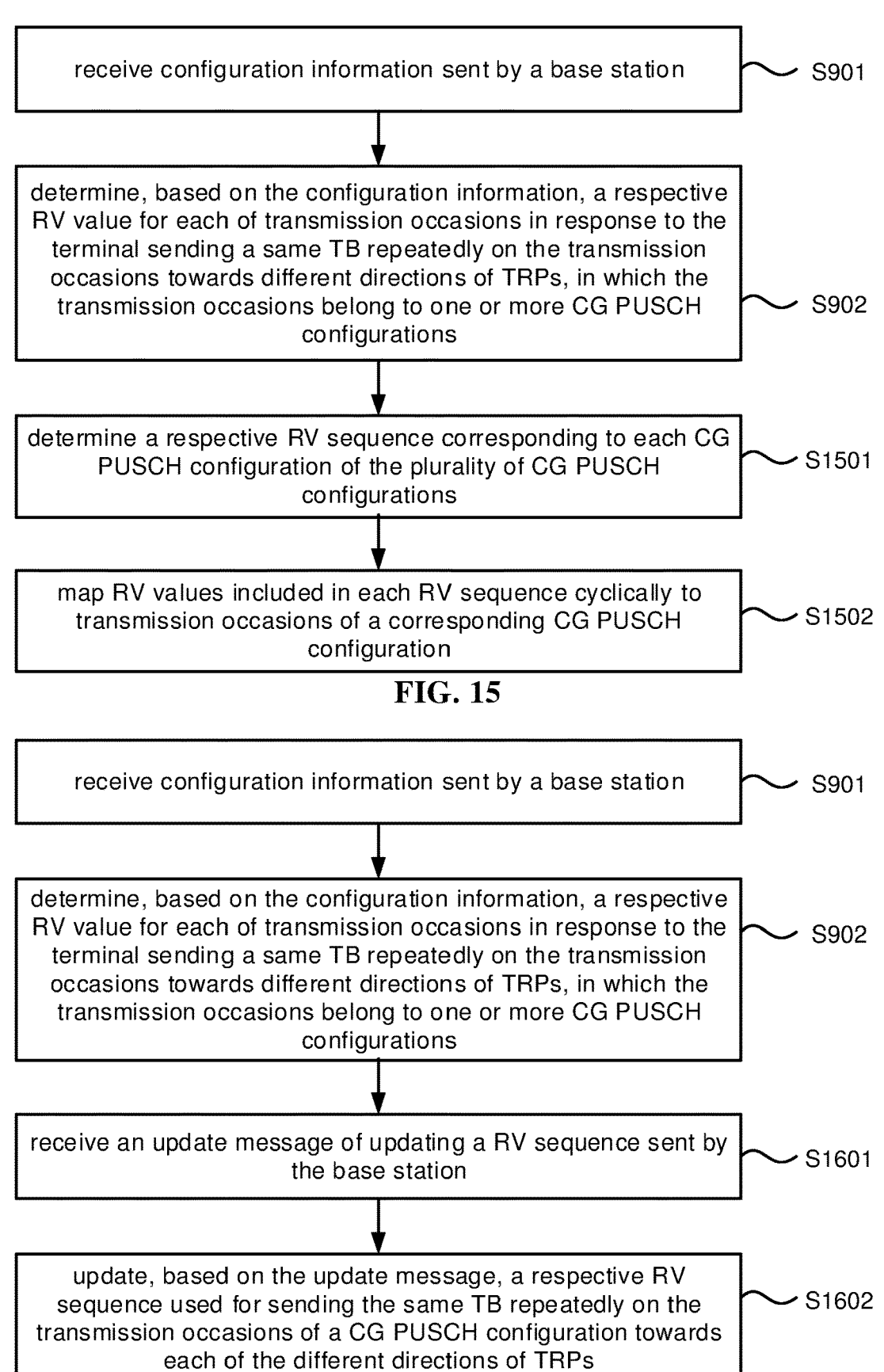

receive configuration information sent by a base station ⟶ S901 determine, based on the configuration information, a respective RV value for each of transmission occasions in response to the terminal sending a same TB repeatedly on the transmission occasions towards different directions of TRPs, in which the transmission occasions belong to one or more CG PUSCH configurations ⟶ S902 determine a respective RV sequence corresponding to each CG PUSCH configuration of the plurality of CG PUSCH configurations ⟶ S1501 map RV values included in each RV sequence cyclically to transmission occasions of a corresponding CG PUSCH configuration ⟶ S1502

FIG. 15 receive configuration information sent by a base station ⟶ S901 determine, based on the configuration information, a respective RV value for each of transmission occasions in response to the terminal sending a same TB repeatedly on the transmission occasions towards different directions of TRPs, in which the transmission occasions belong to one or more CG PUSCH configurations ⟶ S902 receive an update message of updating a RV sequence sent by the base station ⟶ S1601 update, based on the update message, a respective RV sequence used for sending the same TB repeatedly on the transmission occasions of a CG PUSCH configuration towards each of the different directions of TRPs ⟶ S1602

FIG. 16 apparatus for determining a RV value

RV configuration receiving module ⌒ 2801

RV value determining module ⌒ 2802 update receiving module ⌒ 3801 updating module ⌒ 3802

3900

3922 processing component wireless transmit/receive component ⌒ 3924 antenna component ⌒ 3926

CONFIGURATION INFORMATION SENDING METHOD AND APPARATUS, AND REDUNDANCY VERSION RV VALUE DETERMINING METHOD AND APPARATUS

CROSS-REFERENCE TO RELATED APPLICATION

This application is a national phase of International Application No. PCT/CN2021/092846, filed on May 10, 2021, the content of which is hereby incorporated by reference in its entirety.

TECHNICAL FIELD

The disclosure relates to a field of communication technologies, in particular to a method for sending configuration information, a method for determining a Redundancy Version (RV) value, an apparatus for sending configuration information, an apparatus for determining a RV value, related communication devices and a related computer-readable storage medium.

BACKGROUND

A base station can enhance downlink transmission through multiple Transmission and Reception Points (TRPs). However, it is difficult to ensure good service performance by only enhancing downlink transmission, and thus it is necessary to enhance uplink transmission as well.

SUMMARY

According to a first aspect of embodiments of the disclosure, a method for sending configuration information, performed by a base station, is provided. The base station is provided with a plurality of transmission and reception points (TRPs) for receiving a Configured Grant Physical Uplink Shared Channel (CG PUSCH). The method includes: sending configuration information to a terminal, in which the configuration information is configured to determine a respective RV value for each of transmission occasion in response to the terminal sending a same Transport Block (TB) repeatedly on the transmission occasions towards different directions of TRPs, and in which the transmission occasions belong to one or more CG PUSCH configurations.

According to a second aspect of embodiments of the disclosure, a method for determining a RV value, performed by a terminal, is provided. The method includes: receiving configuration information sent by a base station; and determining, based on the configuration information, a respective RV value for each of transmission occasions in response to the terminal sending a same TB repeatedly on the transmission occasions towards different directions of TRPs, in which the transmission occasions belong to one or more CG PUSCH configurations.

According to a third aspect of embodiments of the disclosure, a communication device is provided. The communication device includes a processor and a memory for storing a processor executable program. The processor is configured to perform the above methods for sending configuration information.

BRIEF DESCRIPTION OF THE DRAWINGS

The drawings in the following description are only example embodiments of the disclosure, and will be briefly introduced below.

FIG. 1 is a schematic flowchart illustrating a method for sending configuration information according to an embodiment of the disclosure.

FIG. 2 is a schematic flowchart illustrating another method for sending configuration information according to an embodiment of the disclosure.

FIG. 3 is a schematic flowchart illustrating yet another method for sending configuration information according to an embodiment of the disclosure.

FIG. 4 is a schematic flowchart illustrating yet another method for sending configuration information according to an embodiment of the disclosure.

FIG. 5 is a schematic flowchart illustrating yet another method for sending configuration information according to an embodiment of the disclosure.

FIG. 6 is a schematic flowchart illustrating yet another method for sending configuration information according to an embodiment of the disclosure.

FIG. 7 is a schematic flowchart illustrating yet another method for sending configuration information according to an embodiment of the disclosure.

FIG. 8 is a schematic flowchart illustrating yet another method for sending configuration information according to an embodiment of the disclosure.

FIG. 9 is a schematic flowchart illustrating a method for determining a RV value according to an embodiment of the disclosure.

FIG. 10 is a schematic flowchart illustrating another method for determining a RV value according to an embodiment of the disclosure.

FIG. 11 is a schematic flowchart illustrating yet another method for determining a RV value according to an embodiment of the disclosure.

FIG. 12 is a schematic flowchart illustrating yet another method for determining a RV value according to an embodiment of the disclosure.

FIG. 13 is a schematic flowchart illustrating yet another method for determining a RV value according to an embodiment of the disclosure.

FIG. 14 is a schematic flowchart illustrating yet another method for determining a RV value according to an embodiment of the disclosure.

FIG. 15 is a schematic flowchart illustrating yet another method for determining a RV value according to an embodiment of the disclosure.

FIG. 16 is a schematic flowchart illustrating yet another method for determining a RV value according to an embodiment of the disclosure.

DETAILED DESCRIPTION

Figure 17:
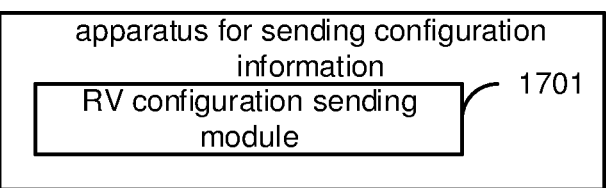
FIG. 17 is a block diagram illustrating an apparatus for sending configuration information according to an embodiment of the disclosure.

Example embodiments of the disclosure will be described in combination with the accompanying drawings. Obviously, the described embodiments are only some of embodiments of the disclosure, rather than all of the embodiments. Based on embodiments of the disclosure, other embodiments can be obtained by those skilled in the art.

The terms used in embodiments of the disclosure are only for the purpose of describing specific embodiments, and are not intended to limit embodiments of the disclosure. The singular forms of "a" and "the" used in the disclosure and appended claims are also intended to include plural forms, unless the context clearly indicates other meanings. It is understandable that the term "and/or" as used herein refers to and includes any or all possible combinations of one or more associated listed items.

It is understandable that although the terms "first", "second", and "third" may be used in embodiments of the disclosure to describe various information, the information should not be limited to these terms. These terms are only used to distinguish the same type of information from each other. For example, without departing from the scope of the disclosure, the first information may also be referred to as the second information, and similarly, the second information may also be referred to as the first information. Depending on the context, the term "if" as used herein can be interpreted as "when", "while" or "in response to determining".

For the purposes of brevity and ease of understanding, the terms "greater than" or "less than", "higher than" or "lower than" are used herein to characterize size relationships. However, it is understandable by those skilled in the art that the term "greater than" also covers the meaning of "greater than or equal to", and "less than" also covers the meaning of "less than or equal to". Similarly, the term "higher than" covers the meaning of "higher than or equal to", and the meaning of "lower than" also covers the meaning of "lower than or equal to".

Currently, a base station can enhance downlink transmission through multiple Transmission and Reception Points (TRPs). However, it is difficult to ensure good service performance by only enhancing downlink transmission, and thus it is necessary to enhance uplink transmission as well. uplink transmission enhancement does not provide reasonable cooperation, which makes it difficult to achieve uplink transmission enhancement.

In view of this, embodiments of the disclosure provide a method for sending configuration information, a method for determining a Redundancy Version (RV) value, an apparatus for sending configuration information, an apparatus for determining a RV value, related communication devices and a related computer-readable storage medium, to address the technical problem existing in the related art.

FIG. 1 is a schematic flowchart illustrating a method for sending configuration information according to an embodiment of the disclosure. The method for sending configuration information according to this embodiment may be performed by a base station. The base station includes, but is not limited to, a base station in a communications system, such as a 4G base station, a 5G base station, a 6G base station, or the like. The base station may communicate with a terminal acting as a user equipment. The terminal includes, but is not limited to, a communication device, such as a cell phone, a tablet computer, a wearable device, a sensor, an Internet of Things (IoT) device, or the like.

In an embodiment, the base station is provided with a plurality of TRPs for receiving a configured grant physical uplink shared channel (CG PUSCH).

As illustrated in FIG. 1, the method for sending configuration information includes the following.

At step S101, configuration information is sent to a terminal, in which the configuration information is configured to determine a respective RV value for each of transmission occasions in response to the terminal sending a same transport block (TB) repeatedly on the transmission occasions towards different directions of TRPs, and the transmission occasions belong to one or more CG PUSCH configurations.

In an embodiment, the terminal may perform the uplink transmission towards the different directions of TRPs, for example, sending the PUSCH towards the different directions of TRPs. The terminal may use different beams in the different directions of TRPs. The base station may configure a respective transmission resource for the uplink transmission performed by the terminal towards each of the different directions of TRPs.

For example, when the terminal transmits the PUSCH, in order to enhance the uplink transmission, the base station can configure that the terminal repeatedly transmits the same TB. The repetition transmission method can be CG, configuring CG PUSCH configuration(s) for the terminal towards the different directions of TRPs (such as for uplink beams respectively used by the terminal towards the different directions of TRPs). In detail, one CG PUSCH configuration can be configured or multiple CG PUSCH configurations can be configured.

Multiple transmission occasions (TOs), which can also be called transmission opportunities, can be included in the CG PUSCH configuration(s). The terminal can transmit the same TB repeatedly using the multiple transmission occasions. The transmission occasions of the CG PUSCH configuration(s) can be configured to uplink transmissions of the terminal towards the different directions of TRPs. Specific relationships between the CG PUSCH configurations and the uplink transmissions of the terminal towards the different directions of TRPs will be described in the following.

In order to send the same TB repeatedly towards the different directions of TRPs using the transmission occasions of the CG PUSCH configuration(s), the terminal needs to determine a respective RV value used on each of the transmission occasions, perform rate matching on a corresponding transmission occasion based on the RV value, and then send the TB.

In an embodiment, the base station can send the configuration information to the terminal. The configuration information may, on the one hand, be used by the terminal to determine a respective RV value for each of the transmission occasions when the terminal repeatedly sends the same TB on the transmission occasions towards the different directions of TRPs, so that the terminal is able to perform the rate matching based on the respective RV values corresponding to the transmission occasions. The configuration information may, on the other hand, be used by the base station to determine a respective RV value for each of the transmission occasions when the terminal repeatedly sends the same TB on the transmission occasions towards the different directions of TRPs, such that the base station is able to perform the rate matching using the respective RV values when receiving the TB sent by the terminal, for reception and decoding.

In an embodiment, the terminal repeatedly sends the same TB in a transmission manner of PUSCH Repetition Type A or a transmission manner of PUSCH Repetition Type B, which can be selected as needed and is not limited in the disclosure.

For the transmission manner of PUSCH Repetition Type A, one PUSCH is transmitted across K consecutive slots. There is a transmission occasion in each slot, and thus there is a total of K transmission occasions. The transmission starts from the $S^{th}$ symbol in a starting slot, and each transmission occasion lasts for L symbols while S+L does not exceed the slot boundary.

In this case, since each transmission occasion does not exceed the slot boundary, in the absence of conflict, each transmission occasion is the same as the transmission occasion of the CG PUSCH configuration configured by the base station. This type of transmission occasion can be referred to as nominal transmission occasion.

For the transmission manner of PUSCH Repeat Type B, a PUSCH is transmitted across K consecutive transmission occasions starting from the $S^{th}$ symbol in a starting slot. Each transmission occasion occupies L symbols back-to-back, and S+L can cross the slot boundary. When a transmission occasion crosses the slot boundary, the transmission is re-split. For the entire transmission, the slot L40K represents a length of a time window for transmitting the PUSCH, and downlink symbols (time domain symbols) and other invalid symbols will be discarded and not used for transmitting the PUSCH.

In this case, since the transmission occasion may exceed the slot boundary and thus be re-split, causing that the transmission occasion actually used by the terminal is different from the transmission occasion of the CG PUSCH configuration configured by the base station, this type of transmission occasion may be referred to as actual transmission occasion.

In addition, if downlink symbols and other invalid symbols are discarded and not used for the PUSCH transmission, causing that the transmission occasion actually used by the terminal is different from the transmission occasion of the CG PUSCH configuration configured by the base station, this type of transmission occasion may also be referred to as actual transmission occasion.

In an embodiment, the type of CG PUSCH configuration configured by the base station for the terminal may be CG Type 1 or CG Type 2, which may be selected as needed and will not be limited in the disclosure.

For the configuration of CG Type 1, the uplink grant including the grant activation is provided by a RRC layer, and it will take effect immediately when a RRC configuration is received correctly. All transmission parameters are configured through a RRC signaling, including the periodicity, the time offset, the frequency resources, and the modulation and coding manner used for the uplink transmission. After receiving the RRC configuration, the terminal starts the transmission using the CG configuration at the moment given by the periodicity and the time offset. The time offset can be used to control at which moment the terminal is allowed to transmit.

For the configuration of CG Type 2, the transmission periodicity is provided by the RRC layer. The base station achieves the resource activation and configures some of the transmission parameters through the DCI, to achieve the activation transmission of the grant configuration. After the terminal receives an activation command, if data included in the cache is to be sent, the data will be transmitted based on the pre-configured periodicity, and if there is no data, the terminal will not transmit any data. The activation time is clarified through a transmission time of a Physical Downlink Control Channel (PDCCH). The terminal confirms the activation/de-activation of the configuration of CG Type 2 by a Media Access Control (MAC) control signaling of the uplink transmission.

In an embodiment, the method further includes: receiving the same TB repeatedly sent by the terminal on the transmission occasions towards the different directions of TRPs.

The base station may receive the same TB repeatedly sent by the terminal on the transmission occasions towards the different directions of TRPs. When receiving the TB sent on each transmission occasion, the rate matching may be performed using a respective RV value corresponding to the transmission occasion for reception and decoding.

In an embodiment, the method further includes: sending one CG PUSCH configuration to the terminal, in which the transmission occasions on which the terminal repeatedly sends the same TB towards the different directions of TRPs belong to the same CG PUSCH configuration.

The base station may send only one CG PUSCH configuration to the terminal for use when the terminal repeatedly transmits the same TB towards the different directions of TRPs. In this case, the transmission occasions of the one CG PUSCH configuration needs to be allocated for use by the terminal to repeatedly transmit the same TB towards the different directions of TRPs.

For example, the transmission occasions of the one CG PUSCH configuration can be equally allocated to be used by the terminal to repeatedly send the same TB towards the different directions of TRPs. Taking 2 directions of TRPs as an example, if there are 8 transmission occasions of the CG PUSCH configuration, the terminal can use 4 of these transmission occasions to send the same TB repeatedly towards a direction of TRP1 and use remaining 4 transmission occasions to send the same TB repeatedly towards a direction of TRP2.

For example, the transmission occasions of the one CG PUSCH configuration can be multiplexed and assigned to be used by the terminal to repeatedly send the same TB towards each of the different directions of TRPs. Taking 2 directions of TRPs as an example, if there are 8 transmission occasions of the CG PUSCH configuration, the terminal can use all the 8 transmission occasions to send the same TB repeatedly towards a direction of TRP1, and the 8 transmission occasions are multiplexed and used by the terminal to send the same TB repeatedly towards a direction of TRP2. The terminal can use different antennas or a same antennas for the uplink transmissions towards the different directions of TRPs.

In an embodiment, in the case that the base station sends one CG PUSCH configuration to the terminal, the configuration information belongs to this CG PUSCH configuration, and the configuration information may include a plurality of RV sequences, or the configuration information may include one RV sequence, or the configuration information may include one RV sequence and offset parameter(s).

There are 3 types of RV sequences, but the disclosure is not limited thereto, namely $\{0, 2, 3, 1\}$, $\{0, 0, 0, 0\}$, and $\{0, 3, 0, 3\}$. In the case where the configuration information includes the plurality of RV sequences, the plurality of RV sequences may be the same type of RV sequences or different types of RV sequences. The following embodiments are mainly described with respect to the different types of RV sequences.

FIG. 2 is a schematic flowchart illustrating another method for sending configuration information according to an embodiment of the disclosure. As illustrated in FIG. 2, the configuration information includes a plurality of RV sequences, and the method includes the following.

At step S201, the transmission occasions of the CG PUSCH configuration are divided into groups based on the directions of TRPs and a beam mapping rule, to determine a respective transmission occasion group corresponding to each of the directions of TRPs.

At step S202, a respective RV sequence corresponding to each of the transmission occasion groups is determined.

At step S203, RV values included in each RV sequence are mapped cyclically to transmission occasions included in a corresponding transmission occasion group.

In an embodiment, in the case where the configuration information includes the plurality of RV sequences, each of the plurality of RV sequences needs to be mapped to the transmission occasions of a corresponding CG PUSCH configuration used by the terminal for uplink transmission towards a respective one of the directions of TRPs. In this case, since there is only one CG PUSCH configuration, the transmission occasions of the CG PUSCH configuration need to be divided into groups.

The transmission occasions of the CG PUSCH configuration can be divided into groups based on the directions of TRPs and the beam mapping rule, to determine respective transmission occasion groups corresponding to the directions of TRPs.

The terminal can use different beams for uplink transmissions towards the different directions of TRPs. For example, the terminal uses a beam 1 for the uplink transmission towards the direction of TRP1 and uses a beam 2 for the uplink transmission towards the direction of TRP2. The beam mapping rule is a mapping relation between the transmission occasions of the CG PUSCH configuration and the beams used by the terminal for the uplink transmissions towards the different directions of TRPs.

There are 3 types of beam mapping rules, but the disclosure is not limited thereto, namely, periodical mapping, continuous mapping, and half mapping. As an example, there are 8 transmission occasions of the CG PUSCH configuration and there are 2 directions of TRPs, in which the beams used towards 2 directions of TRPs are beam 1 towards a direction of TRP1 and beam 2 towards a direction of TRP2.

In the case of periodical mapping, the 8 transmission occasions are mapped to the beam 1 and the beam 2 in turn one by one. For example, the 1st, 3rd, 5th, and 7th transmission occasions are mapped to the beam 1, and the 2nd, 4th, 6th, and 8th transmission occasions are mapped to the beam 2.

In the case of continuous mapping, a mapping pattern to the two beams is beam 1, beam 1, beam 2, and beam 2. Then, the 8 transmission occasions are mapped to the beam 1 and the beam 2 based on the mapping pattern. That is, the 1st, 2nd, 5th, and 6th transmission occasions are mapped to the beam 1, and the 3rd, 4th, 7th, and 8th transmission occasions are mapped to the beam 2.

In the case of half mapping, a first half of the 8 transmission occasions are mapped to the beam 1 and the other half of the transmission occasions are mapped to the beam 2. That is, the 1st, 2nd, 3rd, and 4th transmission occasions are mapped to the beam 1, and the 5th, 6th, 7th, and 8th transmission occasions are mapped to the beam 2.

The specific beam mapping rule is selected as needed, and is not limited in the disclosure. The following description is mainly described with respect to periodical mapping for the sake of illustration.

For the periodical mapping, a respective transmission occasion group may be determined for the uplink transmission towards each of the directions of TRPs. As described above, for the 2 directions of TRPs, the 8 transmission occasions of the CG PUSCH configuration can be divided into 2 transmission occasion groups, where the transmission occasion group 1 corresponding to the direction of TRP1 includes the 1st, 3rd, 5th, and 7th transmission occasions, and the transmission occasion group 2 corresponding to the direction of TRP2 includes the 2nd, 4th, 6th, and 8th transmission occasions.

The number of RV sequences included in the configuration information may correspond to the number of transmission occasion groups. For example, 2 RV sequences can be configured and allocated to 2 transmission occasion groups respectively, i.e., a RV sequence 1 corresponding to the transmission occasion group 1 and a RV sequence 2 corresponding to the transmission occasion group 2.

For example, if the RV sequence 1 is {0, 2, 3, 1} and the RV sequence 2 is {0, 3, 0, 3}, then the RV values included in the RV sequence 1 {0, 2, 3, 1} are cyclically mapped to the 1st, 3rd, 5th, and 7th transmission occasions. Thai is, the RV value of the 1st transmission occasion is 0, the RV value of the 3rd transmission occasion is 2, the RV value of the 5th transmission occasion is 3, and the RV value of the 7th transmission occasion is 1. Similarly, the RV values included in the RV sequence 2 {0, 3, 0, 3} are circularly mapped to the 2nd, 4th, 6th, and 8th transmission occasions. That is, the RV value of the 2nd transmission occasion is 0, the RV value of the 4th transmission occasion is 3, the RV value of the 6th transmission occasion is 0, and the RV value of the 8th transmission occasion is 3.

FIG. 3 is a schematic flowchart illustrating yet another method for sending configuration information according to an embodiment of the disclosure. As illustrated in FIG. 3, the configuration information includes one RV sequence and offset parameter(s), and the method includes the following.

At step S301, a plurality of RV sequences containing the RV sequence are determined based on the RV sequence and the offset parameter(s).

At step S302, the transmission occasions of the CG PUSCH configuration are divided into groups based on the directions of TRPs and a beam mapping rule, to determine a respective transmission occasion group corresponding to each of the directions of TRPs.

At step S303, respective RV sequences corresponding to the transmission occasion groups are determined.

At step S304, RV values included in each RV sequence are mapped cyclically to transmission occasions included in a corresponding transmission occasion group.

In an embodiment, in the case where the configuration information includes one RV sequence and the offset parameter(s), a plurality of RV sequences containing the RV sequence are determined based on the RV sequence and the offset parameter(s). For example, a new RV sequence may be determined based on the RV sequence and one offset parameter, and the original RV sequence and the new RV sequence can constitute the plurality of RV sequences.

For example, taking the RV sequence {0, 2, 3, 1} as an example, if one offset parameter is 2, the values in the RV sequence can be shifted to the left by 2 bits to obtain the new RV sequence {3, 1, 0, 2}. Or, in accordance with the quadratic system, each RV value is added by 2 to obtain the new RV sequence {2, 0, 1, 3}. The way of obtaining the new RV sequences based on the RV sequence and the offset parameter(s) may be selected as needed, which includes but is not limited to the two ways described above.

Therefore, the plurality of RV sequences can be obtained by carrying only one RV sequence and the offset parameter(s) in the configuration information, which is conducive to reducing the number of resources occupied by the configuration information compared with carrying the plurality of RV sequences in the configuration information.

Steps S302 to S304 are implemented in a manner similar to embodiments illustrated in FIG. 2 and will not be repeated herein.

FIG. 4 is a schematic flowchart illustrating yet another method for sending configuration information according to an embodiment of the disclosure. As illustrated in FIG. 4, the configuration information includes one RV sequence, and the method includes the following.

At step S401, RV values included in the RV sequence are mapped cyclically to the transmission occasions of the CG PUSCH configuration, or the RV values included in the RV sequence are mapped cyclically to the transmission occasions towards different directions of TRPs.

In an embodiment, in the case where the configuration information includes one RV sequence, there are two mapping methods of mapping the RV sequence to the transmission occasions of the CG PUSCH configuration used by the terminal for the uplink transmissions towards the different directions of TRPs.

One mapping method is to cyclically map the RV values included in the RV sequence to the transmission occasions of the CG PUSCH configuration without distinguishing the directions of TRPs in which the uplink transmissions are performed by the terminal on the transmission occasions of the CG PUSCH configuration. For example, for the RV sequence {0, 2, 3, 1}, the RV values are cyclically mapped to 8 transmission occasions. That is, the RV value of the 1st transmission occasion is 0, the RV value of the 2nd transmission occasion is 2, the RV value of the 3rd transmission occasion is 3, the RV value of the 4th RV of the transmission occasion is 1, the RV value of the 5th transmission occasion is 0, the RV value of the 6th transmission occasion is 2, the RV value of the 7th transmission occasion is 3, and the RV value of the 8th transmission occasion is 1.

The second mapping method is to cyclically map the RV values included in the RV sequence to the transmission occasions towards each of the different directions of TRPs with distinguishing the directions of TRPs in which uplink transmissions are performed by the terminal on the transmission occasions of the CG PUSCH configuration. For example, for the RV sequence {0, 2, 3, 1}, the RV values are cyclically mapped to 8 transmission occasions, in which the 1st, 3rd, 5th, and 7th transmission occasions are mapped to uplink transmission towards the direction of TRP1, while the 2nd, 4th, 6th, and 8th transmission occasions are mapped to uplink transmission towards the direction of TRP2. Thus, for the uplink transmission on the 4 transmission occasions towards the direction of TRP1, the RV value of the 1st transmission occasion is 1, the RV value of the 3rd transmission occasion is 2, the RV value of the 5th transmission occasion is 3, and the RV value of the 7th transmission occasion is 1; and for uplink transmission on the 4 transmission occasions towards the direction of TRP2, the RV value of the 2nd transmission occasion is 0, the RV value of the 4th transmission occasion is 2, the RV value of the 6th transmission occasion is 3, and the RV value of the 8th transmission occasion is 1.

In an embodiment, the method further includes: sending a plurality of CG PUSCH configurations to the terminal, in which the transmission occasions on which the terminal repeatedly sends the same TB towards the different directions of TRPs belong to different CG PUSCH configurations of the plurality of CG PUSCH configurations.

The base station may only send the plurality of CG PUSCH configurations to the terminal for use in repeatedly sending by the terminal the same TB towards the different directions of TRPs. In this case, each CG PUSCH configuration corresponds to the uplink transmission towards a respective one of the different directions of TRPs, such that for an uplink transmission towards a certain direction of TRP, the transmission occasions of a corresponding CG PUSCH configuration can be used directly.

Taking 2 directions of TRPs as an example, the base station can send 2 CG PUSCH configurations to the terminal, where CG PUSCH Configuration 1 corresponds to the direction of TRP1 and CG PUSCH Configuration 2 corresponds to the direction of TRP2. The terminal can use the transmission occasions of the CG PUSCH Configuration 1 when repeatedly sending the same TB towards the direction of TRP1, and use the transmission occasions of the CG PUSCH Configuration 2 when repeatedly sending the same TB towards the direction of TRP2.

In an embodiment, the configuration information includes a plurality of RV sequences, and the RV sequences are configured to be allocated to the plurality of CG PUSCH configurations respectively. Or, the configuration information includes one RV sequence configured to be allocated to the plurality of CG PUSCH configurations. Or, the configuration information includes one RV sequence and offset parameter(s) configured to be allocated to the plurality of CG PUSCH configurations.

In an embodiment, since the base station configures the plurality of CG PUSCH configurations to the terminal, in the case where the configuration information includes the plurality of RV sequences, the RV sequences need to be allocated to the multiple CG PUSCH configurations respectively. For example, if the number of RV sequences is the same as the number of CG PUSCH configurations, e.g., 2 RV sequences and 2 CG PUSCH configurations, the RV sequence 1 is allocated to the CG PUSCH Configuration 1, and the RV sequence 2 is allocated to the CG PUSCH Configuration 2.

Similarly, in the case where the configuration information includes one RV sequence, this RV sequence is configured to be allocated to the plurality of CG PUSCH configurations. In the case where the configuration information includes one RV sequence and offset parameter(s), the RV sequence and the offset parameter(s) are configured to be allocated to the plurality of CG PUSCH configurations.

FIG. 5 is a schematic flowchart illustrating yet another method for sending configuration information according to an embodiment of the disclosure. As illustrated in FIG. 5, the configuration information includes the multiple RV sequences, and the method includes the following.

At step S501, RV values included in each RV sequence are mapped cyclically to transmission occasions of a CG PUSCH configuration corresponding to the RV sequence.

In an embodiment, since each RV sequence corresponds to a respective different CG PUSCH configuration, the RV values included in each RV sequence can be directly mapped to the transmission occasions of a respective CG PUSCH configuration corresponding to the RV sequence cyclically. For example, the RV sequence 1 is allocated to the CG PUSCH Configuration 1, and the RV sequence 2 is allocated to CG PUSCH Configuration 2. If the RV sequence 1 is {0, 2, 3, 1} and the transmission occasions of the CG PUSCH Configuration 1 are T1 to T8, then the RV values included in {0, 2, 3, 1} are cyclically mapped to T1 to T8. If the RV sequence 2 is {0, 3, 0, 3} and the transmission occasions of CG PUSCH Configuration 2 are T1' to T8', then the RV values included in {0, 3, 0, 3} can be mapped cyclically to T1' to T8'.

FIG. 6 is a schematic flowchart illustrating yet another method for sending configuration information according to an embodiment of the disclosure. As illustrated in FIG. 6, the configuration information includes one RV sequence and offset parameter(s) configured for the plurality of CG PUSCH configurations, and the method includes the following.

At step S601, a plurality of RV sequences containing the RV sequence are determined based on the RV sequence and the offset parameter(s).

At step S602, a respective RV sequence corresponding to each of the plurality of CG PUSCH configurations is determined.

At step S603, RV values included in each RV sequence are mapped cyclically to transmission occasions of a corresponding CG PUSCH configuration.

In an embodiment, if the configuration information includes one RV sequence and the offset parameter(s), a plurality of RV sequences containing the RV sequence are determined based on the RV sequence and the offset parameter(s). For example, a new RV sequence may be determined based on the RV sequence and one offset parameter, and the original RV sequence and the new RV sequence can constitute the plurality of RV sequences.

For example, taking the RV sequence {0, 2, 3, 1} as an example, if one offset parameter is 2, then the RV values included in the RV sequence can be shifted to the left by 2 bits to obtain the new RV sequence {3, 1, 0, 2}. Or, in accordance with the quadratic system, each RV value is added by 2 to obtain the new RV sequence {2, 0, 1, 3}. The way of obtaining the new RV sequence based on the RV sequence and the offset parameter(s) may be selected as needed, which includes but is not limited to the two ways described above.

Therefore, the plurality of RV sequences can be obtained based on the RV sequence and the offset parameter(s) carried in the configuration information, which is conducive to reducing the number of resources occupied by the configuration information compared with carrying the plurality of RV sequences in the configuration information.

Since the configuration information includes one RV sequence and the offset parameter(s) that can be used to determine the plurality of RV sequences, rather than including the plurality of RV sequences directly, after determining the plurality of RV sequences, it needs to further determine, from the plurality of RV sequences, a respective RV sequence corresponding to each of the plurality of CG PUSCH configurations, and then cyclically map the RV values included in each RV sequence to the transmission occasions of a corresponding CG PUSCH configuration.

For example, for 2 directions of TRPs, by default, the RV sequence included in the configuration information is mapped to the transmission occasions of the CG PUSCH for uplink transmission towards the direction of TRP1, and the new RV sequence is mapped to the transmission occasions of the CG PUSCH for uplink transmission towards the direction of TRP2.

FIG. 7 is a schematic flowchart illustrating yet another method for sending configuration information according to an embodiment of the disclosure. As illustrated in FIG. 7, the configuration information includes one RV sequence configured for the plurality of CG PUSCH configurations, and the method includes the following.

At step S701, a respective RV sequence corresponding to each CG PUSCH configuration of the plurality of CG PUSCH configurations is determined.

At step S702, RV values included in each RV sequence are mapped cyclically to transmission occasions of a corresponding CG PUSCH configuration.

In an embodiment, if the configuration information includes only one RV sequence, since the base station configures the plurality of CG PUSCH configurations for the terminal, this RV sequence is configured for the multiple CG PUSCH configurations. In addition, it needs to determine a respective RV sequence for each of the CG PUSCH configurations. In this case, respective RV sequences corresponding to the CG PUSCH configurations are the same, i.e., the one RV sequence included in the configuration information. The RV values included in the RV sequence are mapped cyclically to the transmission occasions of each of the CG PUSCH configurations. For example, for the transmission occasions of CG PUSCH Configuration 1, the RV values can be determined for respective transmission occasions by mapping this RV sequence. For the transmission occasions of CG PUSCH Configuration 2, the RV values can be determined for respective transmission occasions by mapping this RV sequence.

In an embodiment, the configuration information is carried in a Radio Resource Control (RRC) signaling.

In an embodiment, the RRC signaling contains a plurality of first indication messages related to RV sequences, and the plurality of first indication messages indicate the plurality of RV sequences respectively; or the RRC signaling contains a second indication message related to RV sequences, and the second indication message is configured to indicate the plurality of RV sequences.

In an embodiment, the RRC signaling may indicate the RV sequences separately via the first indication messages. For example, new IEs can be added in the RRC signaling to respectively indicate the RV sequences. For two RV sequences, repK-RV1 can be added to indicate the RV sequence 1, and repK-RV2 can be added to indicate the RV sequence 2.

In an embodiment, the RRC signaling may indicate the plurality of RV sequences collectively via the second indication message. For example, the second indication message can be a RV codepoint to indicate the plurality of RV sequences. For two RV sequences, codepoint values respectively correspond to the RV sequence 1 and the RV sequence 2. For example, the correspondence between RV codepoint and RV sequences is shown in Table 1 below:

TABLE 1

| RV codepoint | RV sequence 1 | RV sequence 2 |
|---|---|---|
| 0 | 0 | 0 |
| 1 | 0 | 1 |
| 2 | 0 | 2 |
| 3 | 1 | 2 |

As shown in Table 1, for example, if the identifier of a RV sequence is 0, it means that the RV sequence is {0, 2, 3, 1}. If the identifier of a RV sequence is 1, it means that the RV sequence is {0, 0, 0, 0}. If the identifier of a RV sequence is 2, it means that the RV sequence is {0, 3, 0, 3}.

Table 1 can be stored in both the base station and the terminal, such that it can be determined that if the RV codepoint is 0, then the RV sequence 1 is {0, 2, 3, 1} and the RV sequence 2 is {0, 2, 3, 1}; if the RV codepoint is 1, then the RV sequence 1 is {0, 2, 3, 1} and the RV sequence 2 is {0, 0, 0, 0}; if the RV codepoint is 2, then the RV sequence 1 is {0, 2, 3, 1} and the RV sequence 2 is {0, 3, 0, 3}; and if the RV codepoint is 3, then the RV sequence 1 is {0, 0, 0, 0} and the RV sequence 2 is {0, 3, 0, 3}.

It is noteworthy that the above Table 1 is an example for the case where the base station configures one CG PUSCH configuration for the terminal and the configuration information includes the plurality of RV sequences. In the case where the base station configures the plurality of CG PUSCH configurations for the terminal, each CG PUSCH configuration corresponds to a respective RV sequence, and thus for each CG PUSCH configuration, the corresponding RV sequence can be indicated by one codepoint, as shown in Table 2.

TABLE 2

| RV codepoint | RV1 |
|---|---|
| 0 | 0 |
| 1 | 1 |
| 2 | 2 |
| 3 | NAN |

Since there are mainly 3 types of RV sequence in general, the indication content can be reserved when the codepoint is 3.

FIG. 8 is a schematic flowchart illustrating yet another method for sending configuration information according to an embodiment of the disclosure. As illustrated in FIG. 8, the method includes the following.

At step S801, an update message for updating a RV sequence is sent to the terminal, in which the update message is configured to instruct the terminal to update a respective RV sequence used for sending the same TB repeatedly on the transmission occasions of a CG PUSCH configuration towards each of the different directions of TRPs.

In an embodiment, the base station can adjust the RV sequences as needed, generate the update message based on the adjusted RV sequences and send the update message to the terminal, so that the terminal can update the RV sequences used for sending the same TB repeatedly on the transmission occasions corresponding to the CG PUSCH configuration towards the different directions of TRPs.

It is noteworthy that the update message may indicate the updated RV sequences in a manner similar to the first indication message or the second indication message described above, which will not be repeated herein.

In an embodiment, the update message is carried in at least one of: DCI or a MAC-CE.

For the CG Type 1 configuration, the update message can be carried in the DCI or the MAC-CE, while for the CG Type 2 configuration, the update information can be carried in the DCI.

In an embodiment, the transmission occasions are nominal transmission occasions for the terminal to send the TB. That is, the RV sequence is mapped only to the nominal transmission occasions without considering the actual transmission occasions. For example, for the transmission manner of PUSCH Repetition Type A, generally, the actual transmission occasions are the same as the nominal transmission occasions, so it only needs to consider to map the RV sequence to the nominal transmission occasions.

In an embodiment, the transmission occasions are actual transmission occasions for the terminal to send the TB. That is, it can consider to map the RV sequence to the actual transmission occasions. For example, for the transmission manner of PUSCH Repetition Type B, in the case where a transmission occasion crosses the slot boundary, it will cause the nominal transmission occasion to be re-split to obtain new actual transmission occasions. For example, if the nominal transmission occasion is split by a slot boundary, then two new actual transmission occasions are obtained, and the RV sequence can be mapped to the actual transmission occasions, to ensure that the mapping result matches the transmission occasions that are actually used.

In an embodiment, the transmission occasion is a transmission occasion that is not discarded due to a conflict among the actual transmission occasions for the terminal to send the TB. That is, only the transmission occasions that are not discarded need to be considered. For example, for the transmission occasions of the CG PUSCH configuration configured by the base station, some of the transmission occasions have already been occupied for downlink transmission or contain invalid symbols, these transmission occasions need to be discarded when uplink transmission is carried out, so that only those transmission occasions that have not been discarded are considered. The RV sequence is mapped to the transmission occasions that are not discarded due to the conflict, to ensure that the mapping result matches the actual use of the transmission occasions.

In an embodiment, the method includes: starting cyclically mapping from a first RV value included in the RV sequence; or starting cyclically mapping from a RV value equaling to 0 included in the RV sequence.

It is noteworthy that in the above embodiments, the cyclical mapping of the RV sequence starts from the first RV value included in the RV sequence, which is only an example of a mapping method. In fact, it is also possible to choose other mapping methods, for example, cyclical mapping starting from the RV value equaling to 0 included in the RV sequence. As an instance, if the RV sequence is {0, 3, 0, 3}, the cyclical mapping can be carried out starting from the second RV value that equals to 0.

FIG. 9 is a schematic flowchart illustrating a method for determining a RV value according to an embodiment of the disclosure. The method for determining a RV value according to embodiments can be performed by a terminal. The terminal includes, but is not limited to, communication devices, such as a cell phone, a tablet computer, a wearable device, a sensor, an IoT device, and the like. The terminal may communicate with a base station acting as a user equipment. The base station includes, but is not limited to, base stations in communication systems, such as 4G base stations, 5G base stations, 6G base stations, and the like.

As illustrated in FIG. 9, the method for determining a RV value includes the following.

At step S901, configuration information sent by a base station is received.

At step S902, a respective RV value for each of transmission occasions in response to the terminal sending a same TB repeatedly on the transmission occasions towards different directions of TRPs is determined based on the configuration information, in which the transmission occasions belong to one or more CG PUSCH configurations.

In an embodiment, the base station sends the configuration information to the terminal. The configuration information may, on the one hand, be used by the terminal to determine the respective RV value for each of the transmission occasions when the terminal repeatedly sends the same TB on the transmission occasions towards the different directions of TRPs, so that the terminal is able to perform rate matching according to the corresponding RV value on each transmission occasion. The configuration information may, on the other hand, be used by the base station to determine the respective RV value for each of the transmission occasions when the terminal repeatedly sends the same TB on the transmission occasions towards the different directions of TRPs. In this way, the base station is able to perform rate matching using the corresponding RV value when it receives the TB sent by the terminal, for reception and decoding.

In an embodiment, the method further includes: sending the same TB repeatedly on the transmission occasions towards the different directions of TRPs.

The terminal may repeatedly send the same TB on each of the transmission occasions towards the different directions of TRPs, and perform rate matching based on the corresponding RV value on each transmission occasion. The base station may receive the same TB repeatedly sent by the terminal on each of the transmission occasions towards the different directions of TRPs. When receiving the TB sent on each of the transmission occasions, the rate matching is carried out using the corresponding RV value of the transmission occasion for reception and decoding.

In an embodiment, the method further includes: receiving one CG PUSCH configuration sent by the base station, in which the transmission occasions on which the terminal repeatedly sends the same TB towards the different directions of TRPs belong to a same CG PUSCH configuration.

The base station may send only one CG PUSCH configuration to the terminal for use when the terminal repeatedly transmits the same TB towards the different directions of TRPs. In this case, the transmission occasions of the one CG PUSCH configuration needs to be allocated for use by the terminal to repeatedly transmit the same TB towards the different directions of TRPs.

For example, the transmission occasions of the one CG PUSCH configuration can be equally allocated to be used by the terminal to repeatedly send the same TB towards the different directions of TRPs. Taking 2 directions of TRPs as an example, if there are 8 transmission occasions of the CG PUSCH configuration, the terminal can use 4 of these transmission occasions to send the same TB repeatedly towards a direction of TRP1, and use remaining 4 transmission occasions to send the same TB repeatedly towards a direction of TRP2.

For example, the transmission occasions of the one CG PUSCH configuration can be multiplexed and assigned to be used by the terminal to repeatedly send the same TB towards each of the different directions of TRPs. Taking 2 directions of TRPs as an example, if there are 8 transmission occasions of the CG PUSCH configuration, the terminal can use all the 8 transmission occasions to send the same TB repeatedly towards a direction of TRP1 and the 8 transmission occasions are multiplexed and used by the terminal to send the same TB repeatedly towards a direction of TRP2. The terminal can use different antennas or a same antennas for the uplink transmissions towards the different directions of TRPs.

In an embodiment, in the case that the base station sends one CG PUSCH configuration to the terminal, the configuration information belongs to this CG PUSCH configuration, and the configuration information may include a plurality of RV sequences, or the configuration information may include one RV sequence, or the configuration information may include one RV sequence and offset parameter(s).

There are 3 types of RV sequences, but the disclosure is not limited thereto, namely, {0, 2, 3, 1}, {0, 0, 0, 0}, and {0, 3, 0, 3}. In the case where the configuration information includes the plurality of RV sequences, the plurality of RV sequences may be the same type of RV sequences different types of RV sequences. The following embodiments are mainly described with respect to the different types of RV sequences.

FIG. 10 is a schematic flowchart illustrating another method for determining a RV value according to an embodiment of the disclosure. As illustrated in FIG. 10, the configuration information includes a plurality of RV sequences and determining, based on the configuration information, a respective RV value for each of the transmission occasions in response to the terminal sending the same TB repeatedly on the transmission occasions towards the different directions of TRPs includes the following.

At step S1001, the transmission occasions of the CG PUSCH configuration are divided into groups based on the directions of TRPs and a beam mapping rule, to determine a respective transmission occasion group corresponding to each of the directions of TRPs.

At step S1002, a respective RV sequence corresponding to each of the transmission occasion groups is determined.

At step S1003, RV values included in each RV sequence are mapped cyclically to transmission occasions included in a corresponding transmission occasion group.

In an embodiment, in the case where the configuration information includes the plurality of RV sequences, each of the plurality of RV sequences needs to mapped to the transmission occasions of a corresponding CG PUSCH configuration used by the terminal for uplink transmission towards a respective direction of the directions of TRPs. In this case, since there is only one CG PUSCH configuration, the transmission occasions of the CG PUSCH configuration need to be divided into groups.

The transmission occasions of the CG PUSCH configuration can be divided into groups based on the directions of TRPs and the beam mapping rule, to determine respective transmission occasion groups corresponding to the directions of TRPs.

The terminal can use different beams for uplink transmissions towards the different directions of TRPs. For example, the terminal uses a beam 1 for the uplink transmission towards the direction of TRP1 and uses a beam 2 for the uplink transmission towards the direction of TRP2. The beam mapping rule is a mapping relation between the transmission occasions of the CG PUSCH configuration and the beams used by the terminal for uplink transmissions towards the different directions of TRPs.

There are 3 types of beam mapping rules, but the disclosure is not limited thereto, namely, periodical mapping, continuous mapping, and half mapping. As an example, there are 8 transmission occasions of the CG PUSCH configuration, and there are 2 directions of TRPs, in which the beams used towards the 2 directions of TRPs are beam 1 towards the direction of TRP1 and beam 2 towards the direction of TRP2.

In the case of periodical mapping, the 8 transmission occasions are mapped to the beam 1 and the beam 2 in turn one by one. For example, the 1st, 3rd, 5th, and 7th transmission occasions are mapped to the beam 1, and the 2nd, 4th, 6th, and 8th transmission occasions are mapped to the beam 2.

In the case of continuous mapping, a mapping pattern to the two beams is beam 1, beam 1, beam 2, and beam 2. Then, the 8 transmission occasions are mapped to the beam 1 and the beam 2 based on the mapping pattern. That is, the 1st, 2nd, 5th, and 6th transmission occasions are mapped to the beam 1, and the 3rd, 4th, 7th, and 8th transmission occasions are mapped to the beam 2.

In the case of half mapping, a first half of the 8 transmission occasions are mapped to the beam 1 and the other half of the transmission occasions are mapped to the beam 2. That is, the 1st, 2nd, 3rd, and 4th transmission occasions are mapped to the beam 1, and the 5th, 6th, 7th, and 8th transmission occasions are mapped to the beam 2.

The specific beam mapping rule is selected as needed, and is not limited in the disclosure. The following description is mainly described with respect to periodical mapping for the sake of illustration.

For the periodical mapping, a respective transmission occasion group may be determined for the uplink transmission towards each of the directions of TRPs. As described above, for a directions of TRPs, the 8 transmission occasions of the CG PUSCH configuration are divided into 2 transmission occasion groups, where the transmission occasion group 1 corresponding to the direction of TRP1 includes the 1st, 3rd, 5th, and 7th transmission occasions, and the transmission occasion group 2 corresponding to the direction of TRP2 includes the 2nd, 4th, 6th, and 8th transmission occasions.

The number of RV sequences included in the configuration information may correspond to the number of transmission occasion groups. For example, 2 RV sequences can be configured and allocated to 2 transmission occasion groups, i.e., a RV sequence 1 corresponding to the transmission occasion group 1, and a RV sequence 2 corresponding to the transmission occasion group 2.

For example, if the RV sequence 1 is $\{0, 2, 3, 1\}$ and the RV sequence 2 is $\{0, 3, 0, 3\}$, then the RV values included in the RV sequence 1 $\{0, 2, 3, 1\}$ are cyclically mapped to the 1st, 3rd, 5th, and 7th transmission occasions. That is, the RV value of the 1st transmission occasion is 0, the RV value of the 3rd transmission occasion is 2, the RV value of the 5th transmission occasion is 3, and the RV value of the 7th transmission occasion is 1. Similarly, the RV values included in the RV sequence 2 $\{0, 3, 0, 3\}$ are circularly mapped to the 2nd, 4th, 6th, and 8th transmission occasions. That is, the RV value of the 2nd transmission occasion is 0, the RV value of the 4th transmission occasion is 3, the RV value of the 6th transmission occasion is 0, and the RV value of the 8th transmission occasion is 3.

FIG. 11 is a schematic flowchart illustrating yet another method for determining a RV value according to an embodiment of the disclosure. As illustrated in FIG. 11, the configuration information includes one RV sequence and offset parameter(s), and determining, based on the configuration information, a respective RV value for each of the transmission occasion in response to the terminal sending the same TB repeatedly on the transmission occasions towards the different directions of TRPs includes the following.

At step S1101, a plurality of RV sequences containing the RV sequence are determined based on the RV sequence and the offset parameter(s).

At step S1102, the transmission occasions of the CG PUSCH configuration are divided into groups based on the directions of TRPs and a beam mapping rule, to determine a respective transmission occasion group corresponding to each of the directions of TRPs.

At step S1103, respective RV sequences corresponding to the transmission occasion groups are determined.

At step S1104, RV values included in each RV sequence are mapped cyclically to transmission occasions included in a corresponding transmission occasion group.

In an embodiment, in the case where the configuration information includes one RV sequence and offset parameter(s), a plurality of RV sequences containing the RV sequence are determined based on the RV sequence and the offset parameter(s). For example, a new RV sequence may be determined based on the RV sequence and one offset parameter, and the original RV sequence and the new RV sequence can constitute the plurality of RV sequences.

For example, taking the RV sequence $\{0, 2, 3, 1\}$ as an example, if one offset parameter is 2, the values in the RV sequence can be shifted to the left by 2 bits to obtain the new RV sequence $\{3, 1, 0, 2\}$. Or, in accordance with the quadratic system, each RV value is added by 2 to obtain the new RV sequence $\{2, 0, 1, 3\}$. The way of obtaining the new RV sequences based on the RV sequence and the offset parameter(s) may be selected as needed, which includes but is not limited to the two ways described above.

Therefore, the plurality of RV sequences can be obtained by carrying only one RV sequence and the offset parameter(s) in the configuration information, which is conducive to reducing the number of resources occupied by the configuration information compared with carrying the plurality of RV sequences in the configuration information.

Steps S1102 to S1104 are implemented in a manner similar to embodiments illustrated in FIG. 10 and will not be repeated herein.

FIG. 12 is a schematic flowchart illustrating yet another method for determining a RV value according to an embodiment of the disclosure. As illustrated in FIG. 12, the configuration information includes one RV sequence, and determining, based on the configuration information, a respective RV value for each of the transmission occasions in response to the terminal sending the same TB repeatedly on the transmission occasions towards the different directions of TRPs includes the following.

At step S1201, RV values included in the RV sequence are mapped cyclically to the transmission occasions of the CG PUSCH configuration, or the RV values included in the RV sequence are mapped cyclically to the transmission occasions towards the different directions of TRPs.

In an embodiment, in the case where the configuration information includes one RV sequence, there are two mapping methods of mapping the RV sequence to the transmission occasions of the CG PUSCH configuration used by the terminal for uplink transmissions towards the different directions of TRPs.

The first mapping method is to cyclically map the RV values included in the RV sequence to the transmission occasion of the CG PUSCH configuration without distinguishing the directions of TRPs in which the uplink transmissions are performed by the terminal on the transmission occasions of the CG PUSCH configuration. For example, for the RV sequence {0, 2, 3, 1}, the RV values are cyclically mapped to 8 transmission occasions. That is, the RV value of the 1st transmission occasion is 0, the RV value of the 2nd transmission occasion is 2, the RV value of the 3rd transmission occasion is 3, the RV value of the 4th RV of the transmission occasion is 1, the RV value of the 5th transmission occasion is 0, the RV value of the 6th transmission occasion is 2, the RV value of the 7th transmission occasion is 3, and the RV value of the 8th transmission occasion is 1.

The second mapping method is to cyclically map the RV values included in the RV sequence to the transmission occasions towards each of the different directions of TRPs with distinguishing the directions of TRPs in which uplink transmissions are performed by the terminal on the transmission occasions of the CG PUSCH configuration. For example, for the RV sequence {0, 2, 3, 1}, the RV values are cyclically mapped to 8 transmission occasions, in which the 1st, 3rd, 5th, and 7th transmission occasions are mapped to uplink transmission towards the direction of TRP1, and the 2nd, 4th, 6th, and 8th transmission occasions are mapped to uplink transmission towards the direction of TRP2. Thus, for the uplink transmission on the 4 transmission occasions towards the direction of TRP1, the RV value of the 1st transmission occasion is 1, the RV value of the 3rd transmission occasion is 2, the RV value of the 5th transmission occasion is 3, and the RV value of the 7th transmission occasion is 1; and for the uplink transmission on the 4 transmission occasions towards the direction of TRP2, the RV value of the 2nd transmission occasion is 0, the RV value of the 4th transmission occasion is 2, the RV value of the 6th transmission occasion is 3, and the RV value of the 8th transmission occasion is 1.

In an embodiment, the method further includes: receiving a plurality of CG PUSCH configurations sent by the base station, in which the transmission occasions on which the terminal repeatedly sends the same TB towards the different directions of TRPs belong to different CG PUSCH configurations of the plurality of CG PUSCH configurations.

The base station may only send the plurality of CG PUSCH configurations to the terminal for use in repeatedly sending by the terminal the same TB towards the different direction of TRPs. In this case, each CG PUSCH configuration corresponds to the uplink transmission towards a respective direction of the different directions of TRPs, such that for an uplink transmission towards a certain direction of TRP, the transmission occasions corresponding to a corresponding CG PUSCH configuration can be used directly.

Taking 2 directions of TRPs as an example, the base station can send 2 CG PUSCH configurations to the terminal, where CG PUSCH Configuration 1 corresponds to the direction of TRP1 and CG PUSCH Configuration 2 corresponds to the direction of TRP2. The terminal can use the transmission occasions of the CG PUSCH Configuration 1 when repeatedly sending the same TB towards the direction of TRP1, and use the transmission occasions of the CG PUSCH Configuration 2 when repeatedly sending the same TB towards the direction of TRP2.

In an embodiment, the configuration information includes a plurality of RV sequences, and the RV sequences are configured to be allocated to the plurality of CG PUSCH configurations respectively. Or the configuration information includes one RV sequence configured to be allocated to the plurality of CG PUSCH configurations. Or, the configuration information includes one RV sequence and offset parameter(s) configured to be allocated to the plurality of CG PUSCH configurations.

In an embodiment, since the base station configures the plurality of CG PUSCH configurations to the terminal, in the case where the configuration information includes the plurality of RV sequences, the RV sequences need to be allocated to the plurality of CG PUSCH configurations respectively. For example, if the number of RV sequences is the same as the number of CG PUSCH configurations, e.g., 2 RV sequence and 2 CG PUSCH configurations, the RV sequence 1 is allocated to the CG PUSCH Configuration 1, and the RV sequence 2 is allocated to the CG PUSCH Configuration 2.

Similarly, in the case where the configuration information includes one RV sequence, this RV sequence is configured to be allocated to the plurality of CG PUSCH configurations. In the case where the configuration information includes one RV sequence and offset parameter(s), the RV sequence and the offset parameter(s) are configured to be allocated to the plurality of CG PUSCH configurations.

FIG. 13 is a schematic flowchart illustrating yet another method for determining a RV value according to an embodiment of the disclosure. As illustrated in FIG. 13, determining, based on the configuration information, a respective RV value for each of the transmission occasions in response to the terminal sending the same TB repeatedly on the transmission occasions towards the different directions of TRPs includes the following.

At step S1301, RV values included in each RV sequence are mapped cyclically to transmission occasions of a CG PUSCH configuration corresponding to the RV sequence.

In an embodiment, since each RV sequence corresponds to a respective different CG PUSCH configuration, the RV values included in each RV sequence can be directly mapped to the transmission occasions of a respective CG PUSCH configuration corresponding to the RV sequence cyclically. For example, the RV sequence 1 is allocated to the CG PUSCH Configuration 1, and the RV sequence 2 is allocated to the CG PUSCH Configuration 2. If the RV sequence 1 is {0, 2, 3, 1} and the transmission occasions of the CG PUSCH Configuration 1 are T1 to T8, then the RV values included in the {0, 2, 3, 1} are cyclically mapped to T1 to T8. If the RV sequence 2 is {0, 3, 0, 3} and the transmission occasions of CG PUSCH Configuration 2 are T1' to T8', then the RV values in the {0, 3, 0, 3} can be mapped cyclically to T1' to T8'.

FIG. 14 is a schematic flowchart illustrating yet another method for determining a RV value according to an embodiment of the disclosure. As illustrated in FIG. 14, the configuration information including one RV sequence and offset parameter(s) configured for the plurality of CG PUSCH configurations and determining, based on the configuration information, a respective RV value for each of the transmission occasions in response to the terminal sending the same TB repeatedly on the transmission occasions towards the different direction of TRPs includes the following.

At step S1401, a plurality of RV sequences containing the RV sequence are determined based on the RV sequence and the offset parameter(s).

At step S1402, a respective RV sequence corresponding to each of the plurality of CG PUSCH configurations is determined.

At step S1403, RV values included in each RV sequence are mapped cyclically to transmission occasions of a corresponding CG PUSCH configuration.

In an embodiment, if the configuration information includes one RV sequence and the offset parameter(s), the plurality of RV sequences containing the RV sequence are determined based on the RV sequence and the offset parameter(s). For example, a new RV sequence may be determined based on the RV sequence and one offset parameter, and the original RV sequence and the new RV sequence can constitute the plurality of RV sequences.

For example, taking the RV sequence {0, 2, 3, 1} as an example, if one offset parameter is 2, the values included in the RV sequence can be shifted to the left by 2 bits to obtain the new RV sequence {3, 1, 0, 2}. Or, in accordance with the quadratic system, each RV value is added by 2 to obtain the new RV sequence {2, 0, 1, 3}. The way of obtaining the new RV sequence based on the RV sequence and the offset parameter(s) may be selected as needed, which includes but is not limited to the two ways described above.

Therefore, the plurality of RV sequences can be obtained based on the RV sequence and the offset parameter(s) carried in the configuration information, which is conducive to reducing the number of resources occupied by the configuration information compared with carrying the plurality of RV sequences in the configuration information.

Since the configuration information includes one RV sequence and the offset parameter(s) that can be used to determine the plurality of RV sequences, rather than including the plurality of RV sequences directly, after determining the plurality of RV sequences, it needs to further determine, from the plurality of RV sequences, a respective RV sequence corresponding to each of the plurality of CG PUSCH configurations, and then cyclically map the RV values included in each RV sequence to the transmission occasions of a corresponding CG PUSCH configuration.

For example, for 2 directions of TRPs, by default, the RV sequence included in the configuration information is mapped to the transmission occasions of the CG PUSCH for uplink transmission towards the direction facing TRP1, and the new RV sequence is mapped to the transmission occasions of the CG PUSCH for uplink transmission towards the direction of TRP2.

FIG. 15 is a schematic flowchart illustrating yet another method for determining a RV value according to an embodiment of the disclosure. As illustrated in FIG. 15, the configuration information includes one RV sequence configured for the plurality of CG PUSCH configurations, and determining, based on the configuration information, a respective RV value for each of the transmission occasions in response to the terminal sending the same TB repeatedly on the transmission occasions towards the different directions of TRPs includes the following.

At step S1501, a respective RV sequence corresponding to each CG PUSCH configuration of the plurality of CG PUSCH configurations is determined.

At step S1502, RV values included in each RV sequence are mapped cyclically to transmission occasions of a corresponding CG PUSCH configuration.

In an embodiment, if the configuration information includes only one RV sequence, since the base station configures the plurality of CG PUSCH configurations for the terminal, this RV sequence is configured for the multiple CG PUSCH configurations. In addition, it needs to determine a respective RV sequence for each of the CG PUSCH configurations. In this case, respective RV sequences corresponding to the CG PUSCH configurations are the same, i.e., the one RV sequence included in the configuration information. The RV values included in the RV sequence are mapped cyclically to the transmission occasions of each of the CG PUSCH configurations. For example, for the transmission occasions of CG PUSCH Configuration 1, the RV values can be determined for respective transmission occasions by mapping this RV sequence. For the transmission occasions of CG PUSCH Configuration 2, the RV values can be determined for respective transmission occasions by mapping this RV sequence.

In an embodiment, the configuration information is carried in a RRC signaling.

In an embodiment, the RRC signaling contains a plurality of first indication messages related to RV sequences, and the plurality of first indication messages indicate the plurality of RV sequences respectively; or the RRC signaling contains a second indication message related to RV sequences, and the second indication message is configured to indicate the plurality of RV sequences.

In an embodiment, the RRC signaling may indicate the RV sequences separately via the first indication messages. For example, new IEs can be added in the RRC signaling to respectively indicate the RV sequences. For two RV sequences, repK-RV1 can be added to indicate the RV sequence 1, and repK-RV2 can be added to indicate the RV sequence 2.

In an embodiment, the RRC signaling may indicate the plurality of RV sequences collectively via the second indication message. For example, the second indication message can be a RV codepoint. For two RV sequences, codepoint values correspond to the RV sequence 1 and the RV sequence 2 respectively. For example, the correspondence between RV codepoint and RV sequences is shown in the above Table 1.

For example, if the identifier of a RV sequence is 0, it means that the RV sequence is {0, 2, 3, 1}. If the identifier of a RV sequence is 1, it means that the RV sequence is {0, 0, 0, 0}. If the identifier of a RV sequence is 2, it means that the RV sequence is {0, 3, 0, 3}.

Table 1 can be stored in both the base station and the terminal such that it can be determined that if the RV codepoint is 0, then the RV sequence 1 is {0, 2, 3, 1} and the RV sequence 2 is {0, 2, 3, 1}; if the RV codepoint is 1, then the RV sequence 1 is {0, 2, 3, 1} and the RV sequence 2 is {0, 0, 0, 0}; if the RV codepoint is 2, then the RV sequence 1 is {0, 2, 3, 1} and RV sequence 2 is {0, 3, 0, 3}; and if the RV codepoint is 3, then the RV sequence 1 is {0, 0, 0, 0} and the RV sequence 2 is {0, 3, 0, 3}.

It is noteworthy that the above Table 1 is an example for the case where the base station configures one CG PUSCH configuration for the terminal and the configuration information includes the plurality of RV sequences. In the case where the base station configures the plurality of CG PUSCH configurations for the terminal, each CG PUSCH configuration corresponds to a respective RV sequence, and thus for each CG PUSCH configuration, a RV sequence can be indicated by one codepoint, as shown in Table 2. Since there are mainly 3 types of RV sequences in general, the indication content can be reserved when the codepoint is 3.

FIG. 16 is a schematic flowchart illustrating yet another method for determining a RV value according to an embodiment of the disclosure. As illustrated in FIG. 16, the method includes the following.

At step S1601, an update message of updating a RV sequence sent by the base station is received.

At step S1602, a respective RV sequence used for sending the same TB repeatedly on the transmission occasions of a CG PUSCH configuration towards each of the different directions of TRPs is updated based on the update message.

In an embodiment, the base station can adjust the RV sequences as needed, generate the update message based on the adjusted RV sequences and send the update message to the terminal, so that the terminal can update the RV sequences used for sending the same TB repeatedly on the transmission occasions corresponding to the CG PUSCH configuration towards the different directions of TRPs.

It is noteworthy that the update message may indicate the updated RV sequences in a manner similar to the first indication message or the second indication message described above, which will not be repeated herein.

In an embodiment, the update message is carried in at least one of: DCI and a MAC-CE.

For the CG Type 1 configuration, the update message can be carried in the DCI or the MAC-CE, while for the CG Type 2 configuration, the update information can be carried in the DCI.

In an embodiment, the transmission occasions are nominal transmission occasions for the terminal to send the TB. That is, the RV sequence is mapped only to the nominal transmission occasions without considering the actual transmission occasions. For example, for the transmission manner of PUSCH Repetition Type A, generally, the actual transmission occasions are the same as the nominal transmission occasions, so it only needs to consider to map the RV sequence to the nominal transmission occasions.

In an embodiment, the transmission occasions are actual transmission occasions for the terminal to send the TB. That is, it can be consider to map the RV sequence to the actual transmission occasions. For example, for the transmission manner of PUSCH Repetition Type B, in the case where a transmission occasion crosses the slot boundary, it will cause the nominal transmission occasion to be re-split to obtain new actual transmission occasions. For example, if the nominal transmission occasion is split by a slot boundary, then two new actual transmission occasions are obtained, and the RV sequence can be mapped to the actual transmission occasions, to ensure that the mapping result matches the transmission occasions that are actually used.

In an embodiment, the transmission occasion is a transmission occasion that is not discarded due to a conflict among the actual transmission occasions for the terminal to send the TB. That is, only the transmission occasions that are not discarded need to be considered. For example, for the transmission occasions of the CG PUSCH configuration configured by the base station, some of the transmission occasions have already been occupied for downlink transmission or contain invalid symbols, these transmission occasions need to be discarded when uplink transmission is carried out, so that only those transmission occasions that have not been discarded are considered. The RV sequence is mapped to the transmission occasions that are not discarded due to the conflict, to ensure that the mapping result matches the actual use of the transmission occasions.

In an embodiment, the method includes: starting cyclically mapping from a first RV value included in the RV sequence; or starting cyclically mapping from a RV value equaling to 0 included in the RV sequence.

It is noteworthy that in the above embodiments, the cyclical mapping of the RV sequence starts from the first RV value included in the RV sequence, which is only an example of a mapping method. In fact, it is also possible to choose other mapping methods, for example, cyclical mapping starting from the RV value equaling to 0 included in the RV sequence. For example, if the RV sequence is {0, 3, 0, 3}, the cyclical mapping can be carried out starting from the second RV value that equals to 0.

Corresponding to the foregoing embodiments of the methods for sending configuration information and the methods for determining a RV value, the disclosure also provides embodiments of an apparatus for sending configuration information and an apparatus for determining a RV value.

FIG. 17 is a schematic diagram illustrating an apparatus for sending configuration information according to an embodiment of the disclosure. The apparatus for sending configuration information of the embodiment can be applied to a base station. The base station includes, but is not limited to, base stations in communication systems, such as 4G base stations, 5G base stations, 6G base stations, and the like. The base station may communicate with a terminal acting as a user equipment. The terminal includes, but is not limited to, communication devices, such as a cell phone, a tablet computer, a wearable device, a sensor, an IoT device, and the like.

In an embodiment, the base station is provided with a plurality of TRPs for receiving a CG PUSCH.

As illustrated in FIG. 17, the apparatus for sending configuration information includes: a RV configuration sending module 1701.

The RV configuration sending module 1701 is configured to send configuration information to a terminal, in which the configuration information is configured to determine a RV value for each of transmission occasions in response to the terminal sending a same TB repeatedly on the transmission occasions towards different directions of TRPs, and the transmission occasions belong to one or more CG PUSCH configurations.

Figure 18:
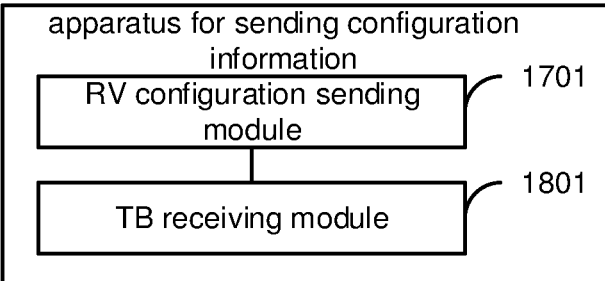
FIG. 18 is a block diagram illustrating another apparatus for sending configuration information according to an embodiment of the disclosure.

FIG. 18 is a schematic diagram illustrating another apparatus for sending configuration information according to an embodiment of the disclosure. As illustrated in FIG. 18, the apparatus further includes: a TB receiving module 1801.

The TB receiving module 1801 is configured to receive the same TB repeatedly sent by the terminal on the transmission occasions towards the different directions of TRPs.

Figure 19:
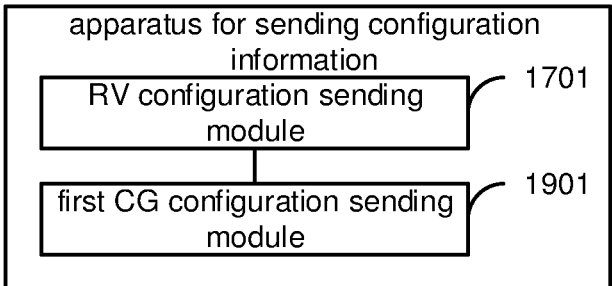
FIG. 19 is a block diagram illustrating yet another apparatus for sending configuration information according to an embodiment of the disclosure.

FIG. 19 is a schematic diagram illustrating yet another apparatus for sending configuration information according to an embodiment of the disclosure. As illustrated in FIG. 19, the apparatus further includes: a first CG configuration sending module 1901.

The first CG configuration sending module 1901 is configured to send a CG PUSCH configuration to the terminal.

The transmission occasions on which the terminal repeatedly sends the same TB towards the different directions of TRPs belong to a same CG PUSCH configuration.

In an embodiment, the configuration information includes a plurality of RV sequences, or the configuration information includes one RV sequence, or the configuration information includes one RV sequence and an offset parameter.

Figure 20:
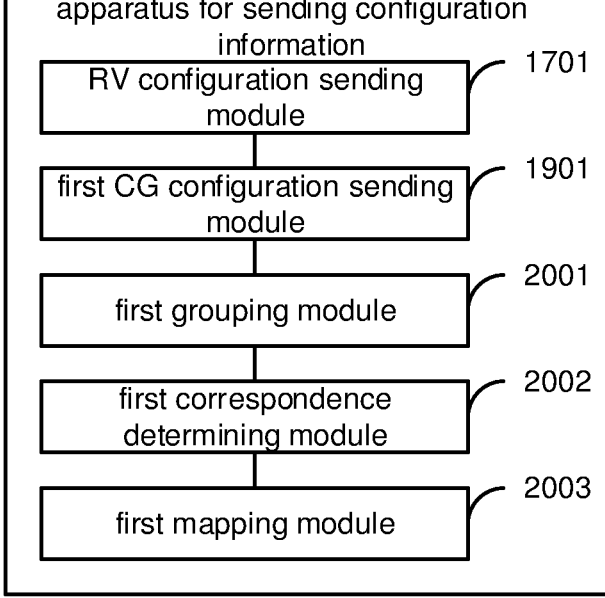
FIG. 20 is a block diagram illustrating yet another apparatus for sending configuration information according to an embodiment of the disclosure.

FIG. 20 is a schematic diagram illustrating yet another apparatus for sending configuration information according to an embodiment of the disclosure. As illustrated in FIG. 20, the configuration information includes the plurality of RV sequences, and the apparatus further includes: a first grouping module 2001, a first correspondence determining module 2002 and a first mapping module 2003.

The first grouping module 2001 is configured to divide the transmission occasions of the CG PUSCH configuration into groups based on the directions of TRPs and a beam mapping rule, to determine a respective transmission occasion group corresponding to each of the directions of TRPs.

The first correspondence determining module 2002 is configured to determine a respective RV sequence corresponding to each of the transmission occasion groups. and The first mapping module 2003 is configured to map RV values included in each RV sequence cyclically to transmission occasions included in a corresponding transmission occasion group.

Figure 21:
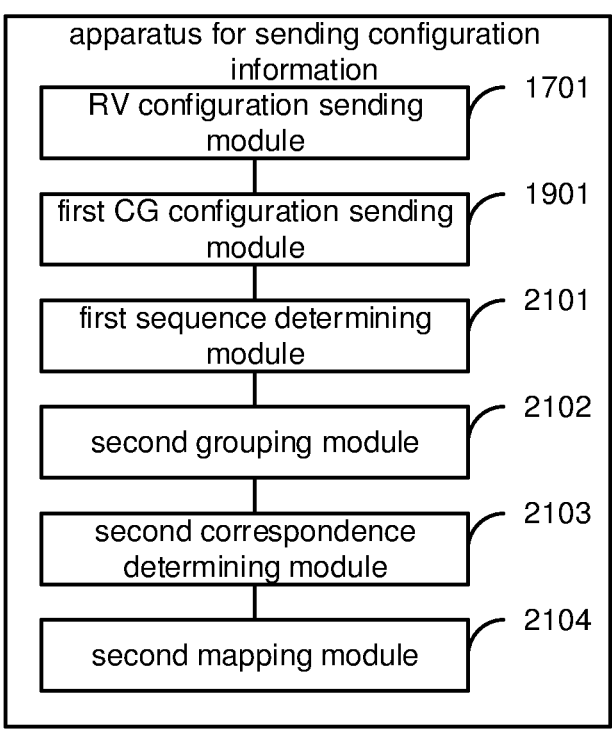
FIG. 21 is a block diagram illustrating yet another apparatus for sending configuration information according to an embodiment of the disclosure.

FIG. 21 is a schematic diagram illustrating yet another apparatus for sending configuration information according to an embodiment of the disclosure. As illustrated in FIG. 21, the configuration information includes one RV sequence and an offset parameter, and the apparatus further includes: a first sequence determining module 2101, a second grouping module 2102, a second correspondence determining module 2103 and a second mapping module 2104.

The first sequence determining module 2101 is configured to determine a plurality of RV sequences containing the RV sequence based on the RV sequence and the offset parameter.

The second grouping module 2102 is configured to divide the transmission occasions of the CG PUSCH configuration into groups based on the directions of TRPs and a beam mapping rule, to determine a respective transmission occasion group corresponding to each of the directions of TRPs.

The second correspondence determining module 2103 is configured to determine a respective RV sequence corresponding to each of the transmission occasion groups.

The second mapping module 2104 is configured to map RV values included in each RV sequence cyclically to transmission occasions included in a corresponding transmission occasion group.

Figure 22:
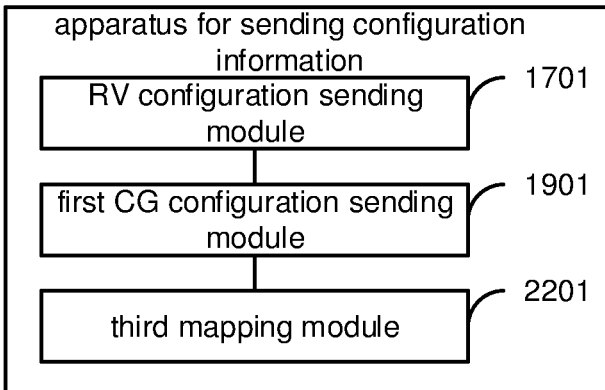
FIG. 22 is a block diagram illustrating yet another apparatus for sending configuration information according to an embodiment of the disclosure.

FIG. 22 is a schematic diagram illustrating yet another apparatus for sending configuration information according to an embodiment of the disclosure. As illustrated in FIG. 22, the configuration information includes one RV sequence, and the apparatus further includes: a third mapping module 220.

The third mapping module 2201 is configured to map RV values included in the RV sequence cyclically to transmission occasions of the CG PUSCH configuration; or, map the RV values included in the RV sequence cyclically to the transmission occasions towards the different directions of TRPs.

Figure 23:
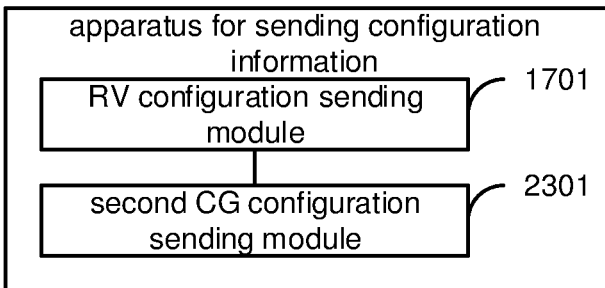
FIG. 23 is a block diagram illustrating yet another apparatus for sending configuration information according to an embodiment of the disclosure.

FIG. 23 is a schematic diagram illustrating yet another apparatus for sending configuration information according to an embodiment of the disclosure. As illustrated in FIG. 23, the apparatus further includes: a second CG configuration sending module 2301.

The second CG configuration sending module 2301 is configured to send a plurality of CG PUSCH configurations to the terminal.

The transmission occasions on which the terminal repeatedly sends the same TB towards different directions of TRPs belong to different CG PUSCH configurations of the plurality of CG PUSCH configurations.

In an embodiment, the configuration information includes a plurality of RV sequences that are configured for the plurality of CG PUSCH configurations respectively, or the configuration information includes one RV sequence configured for the plurality of CG PUSCH configurations, or the configuration information includes one RV sequence and an offset parameter configured for the plurality of CG PUSCH configurations.

Figure 24:
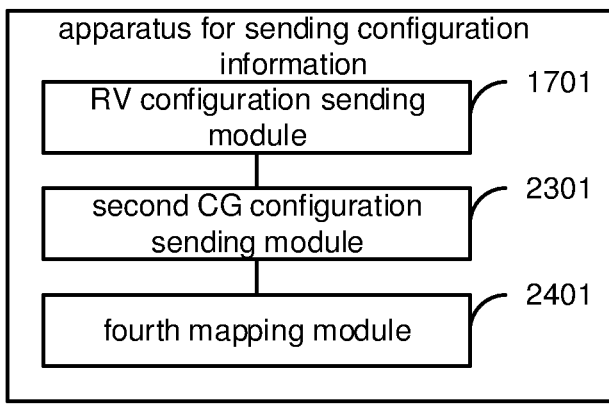
FIG. 24 is a block diagram illustrating yet another apparatus for sending configuration information according to an embodiment of the disclosure.

FIG. 24 is a schematic diagram illustrating yet another apparatus for sending configuration information according to an embodiment of the disclosure. As illustrated in FIG. 24, the configuration information including a plurality of RV sequences, and the apparatus further includes: a fourth mapping module 2401.

The fourth mapping module 2401 is configured to map RV values in each RV sequence cyclically to transmission occasions of a respective CG PUSCH configuration corresponding to the RV sequence.

Figure 25:
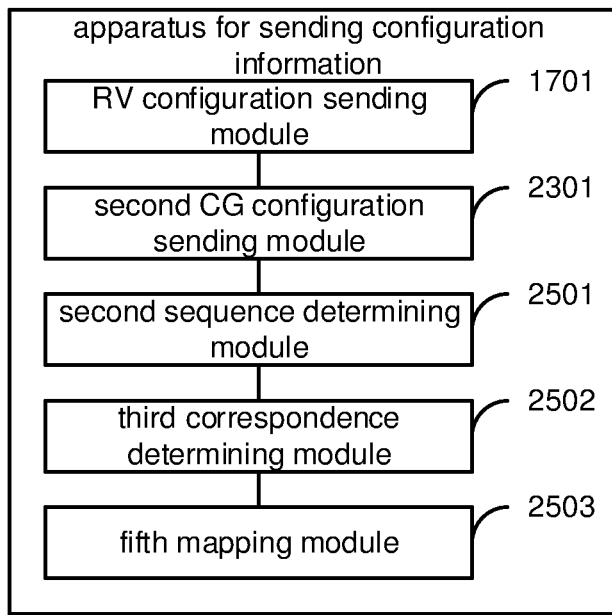
FIG. 25 is a block diagram illustrating yet another apparatus for sending configuration information according to an embodiment of the disclosure.

FIG. 25 is a schematic diagram illustrating yet another apparatus for sending configuration information according to an embodiment of the disclosure. As illustrated in FIG. 25, the configuration information includes one RV sequence and an offset parameter configured for the plurality of CG PUSCH configurations, and the apparatus further includes: a second sequence determining module 2501, a third correspondence determining module 2502 and a fifth mapping module 2503.

The second sequence determining module 2501 is configured to determine a plurality of RV sequences containing the RV sequence based on the RV sequence and the offset parameter.

The third correspondence determining module 2502 is configured to determine a respective RV sequence corresponding to each CG PUSCH configuration in the plurality of CG PUSCH configurations.

The fifth mapping module 2503 is configured to map RV values included in each RV sequence cyclically to transmission occasions of a corresponding CG PUSCH configuration.

Figure 26:
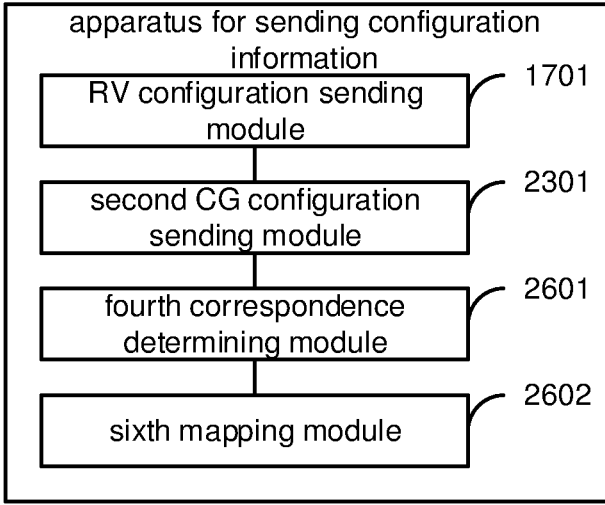
FIG. 26 is a block diagram illustrating yet another apparatus for sending configuration information according to an embodiment of the disclosure.

FIG. 26 is a schematic diagram illustrating yet another apparatus for sending configuration information according to an embodiment of the disclosure. As illustrated in FIG. 26, the configuration information includes one RV sequence configured for the plurality of CG PUSCH configurations, and the apparatus further includes: a fourth correspondence determining module 2601 and a sixth mapping module 2602.

The fourth correspondence determining module 2601 is configured to determine a respective RV sequence corresponding to each CG PUSCH configuration of the plurality of CG PUSCH configurations.

The sixth mapping module 2602 is configured to map RV values included in each RV sequence cyclically to transmission occasions of a corresponding CG PUSCH configuration.

In an embodiment, the configuration information is carried in a RRC signaling.

In an embodiment, the RRC signaling contains a plurality of first indication messages related to RV sequences, and the plurality of first indication messages indicate the plurality of RV sequences respectively; or the RRC signaling contains a second indication message related to RV sequences, and the second indication message is configured to indicate the plurality of RV sequences.

Figure 27:
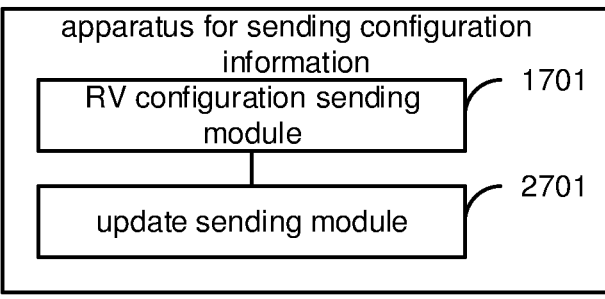
FIG. 27 is a block diagram illustrating yet another apparatus for sending configuration information according to an embodiment of the disclosure.

FIG. 27 is a schematic diagram illustrating yet another apparatus for sending configuration information according to an embodiment of the disclosure. As illustrated in FIG. 27, the apparatus further includes: an update sending module 2701.

The update sending module 2701 is configured to send an update message of updating a RV sequence to the terminal, in which the update message is configured to instruct the terminal to update a respective RV sequence used for sending the same TB repeatedly on the transmission occasions corresponding to a CG PUSCH configuration towards each of the different directions of TRPs.

In an embodiment, the update message is carried in at least one of: DCI or a MAC-CE.

In an embodiment, the transmission occasions are nominal transmission occasions for the terminal to send the TB.

In an embodiment, the transmission occasions are actual transmission occasions for the terminal to send the TB.

In an embodiment, the transmission occasion is a transmission occasion that is not discarded due to a conflict among the actual transmission occasions for the terminal to send the TB.

In an embodiment, the method includes: starting cyclically mapping from a first RV value included in the RV sequence; or starting cyclically mapping from a RV value equaling to 0 included in the RV sequence.

Figure 28:
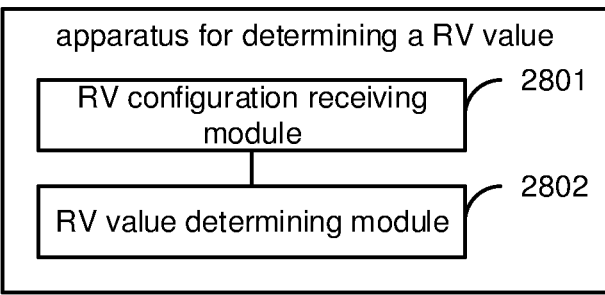
FIG. 28 is a block diagram illustrating an apparatus for determining a RV value according to an embodiment of the disclosure.

FIG. 28 is a schematic diagram illustrating an apparatus for determining a RV value according to an embodiment of the disclosure. The apparatus for determining a RV value of the embodiment can be applied to a terminal. The terminal includes, but is not limited to, communication devices, such as a cell phone, a tablet computer, a wearable device, a sensor, an IoT device, and the like. The terminal may communicate with a base station acting as a user equipment. The base station includes but is not limited to base stations in communication systems, such as 4G base stations, 5G base stations, 6G base stations, and the like.

As illustrated in FIG. 28, the apparatus further includes: a RV configuration receiving module 2801 and a RV value determining module 2802.

The RV configuration receiving module 2801 is configured to receive configuration information sent by a base station.

The RV value determining module 2802 is configured to determine, based on the configuration information, a respective RV value for each of transmission occasions in response to the terminal sending the same TB repeatedly on the transmission occasions towards different directions of TRPs, in which the transmission occasions belong to one or more CG PUSCH configurations.

Figure 29:
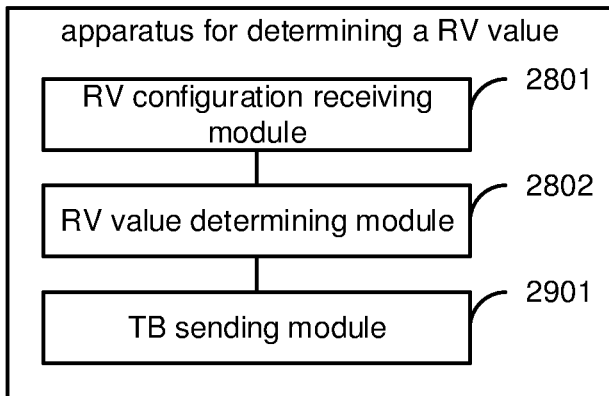
FIG. 29 is a block diagram illustrating another apparatus for determining a RV value according to an embodiment of the disclosure.

FIG. 29 is a schematic diagram illustrating another apparatus for determining a RV value according to an embodiment of the disclosure. As illustrated in FIG. 29, the apparatus further includes: a TB sending module 2901.

The TB sending module 2901 is configured to send the same TB repeatedly on the transmission occasions towards the different directions of TRPs.

Figure 30:
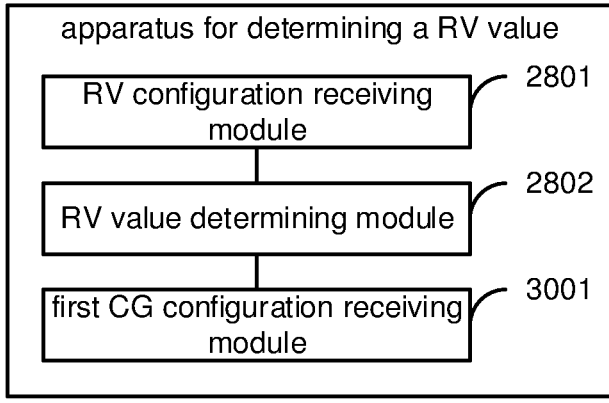
FIG. 30 is a block diagram illustrating yet another apparatus for determining a RV value according to an embodiment of the disclosure.

FIG. 30 is a schematic diagram illustrating yet another apparatus for determining a RV value according to an embodiment of the disclosure. As illustrated in FIG. 30, the apparatus further includes: a first CG configuration receiving module 3001.

The first CG configuration receiving module 3001 is configured to receive a CG PUSCH configuration sent by the base station, in which the transmission occasions on which the terminal repeatedly sends the same TB towards the different directions of TRPs belong to the same CG PUSCH configuration.

In an embodiment, the configuration information includes a plurality of RV sequences, or the configuration information includes one RV sequence, or the configuration information includes one RV sequence and an offset parameter.

Figure 31:
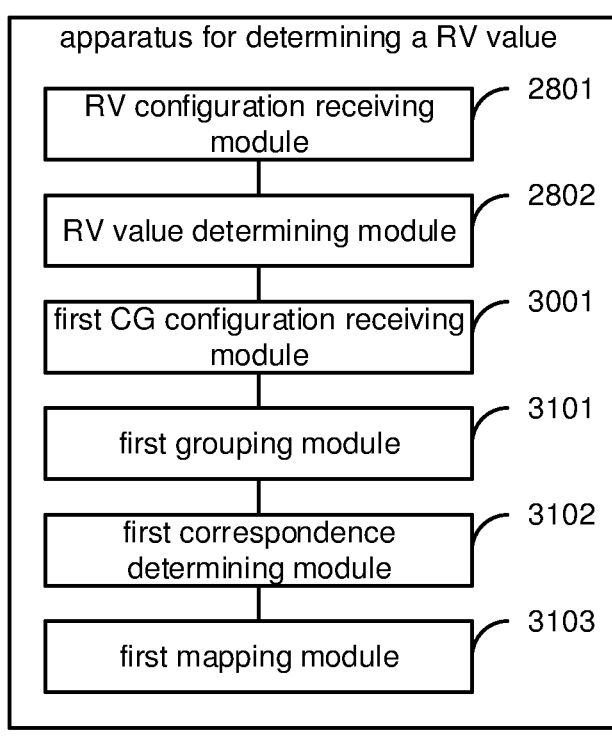
FIG. 31 is a block diagram illustrating yet another apparatus for determining a RV value according to an embodiment of the disclosure.

FIG. 31 is a schematic diagram illustrating yet another apparatus for determining a RV value according to an embodiment of the disclosure. As illustrated in FIG. 31, the configuration information includes a plurality of RV sequences, and for determining, based om the configuration information, a respective RV value for each of the transmission occasions in response to the terminal sending the same TB repeatedly on the transmission occasions towards the different directions of TRPs, the apparatus further includes: a first grouping module 3101, a first correspondence determining module 3102 and a first mapping module 3103.

The first grouping module 3101 is configured to divide the transmission occasions of the CG PUSCH configuration into groups based on the directions of TRPs and a beam mapping rule, to determine a respective transmission occasion group corresponding to each of the directions of TRPs.

The first correspondence determining module 3102 is configured to determine a respective RV sequences corresponding to each of the transmission occasion groups.

The first mapping module 3103 is configured to map RV values included in each RV sequence cyclically to the transmission occasions included in a corresponding transmission occasion group.

Figure 32:
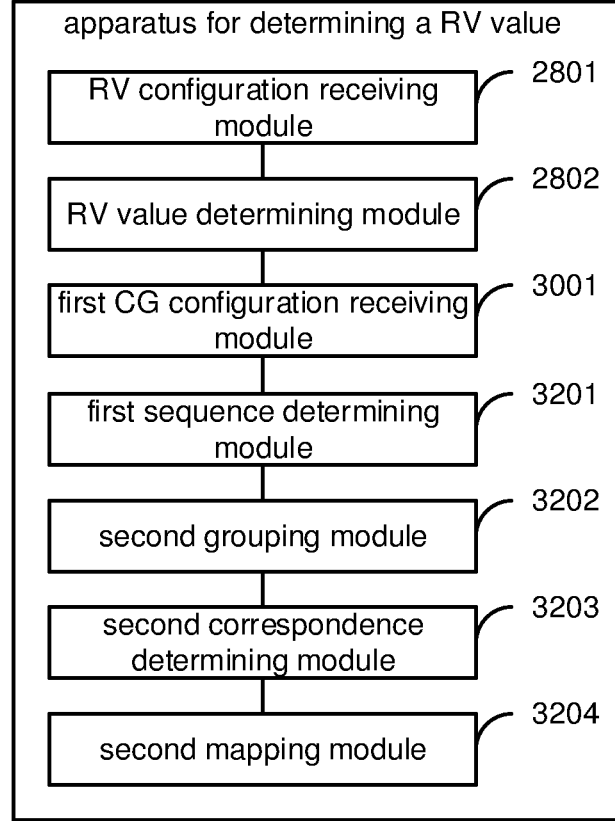
FIG. 32 is a block diagram illustrating yet another apparatus for determining a RV value according to an embodiment of the disclosure.

FIG. 32 is a schematic diagram illustrating yet another apparatus for determining a RV value according to an embodiment of the disclosure. As illustrated in FIG. 32, the configuration information includes one RV sequence and an offset parameter, and for determining, based on the configuration information, a respective RV value for each of the transmission occasions in response to the terminal sending the same TB repeatedly on the transmission occasions towards the different directions of TRPs, the apparatus further includes: a first sequence determining module 3201, a second grouping module 3202, a second correspondence determining module 3203 and a second mapping module 3204.

The first sequence determining module 3201 is configured to determine a plurality of RV sequences containing the RV sequence based on the RV sequence and the offset parameter.

The second grouping module 3202 is configured to divide the transmission occasions of the CG PUSCH configuration into groups based on the directions of TRPs and a beam mapping rule, to determine a respective transmission occasion group corresponding to each of the directions of TRPs, The second correspondence determining module 3203 is configured to determine a respective RV sequence corresponding to each of the transmission occasion groups.

The second mapping module 3204 is configured to map RV values included in each RV sequence cyclically to transmission occasions included in a corresponding transmission occasion group.

Figure 33:
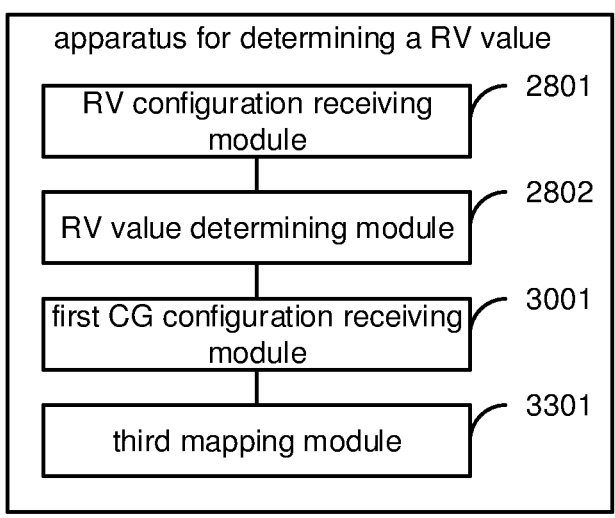
FIG. 33 is a block diagram illustrating yet another apparatus for determining a RV value according to an embodiment of the disclosure.

FIG. 33 is a schematic diagram illustrating yet another apparatus for determining a RV value according to an embodiment of the disclosure. As illustrated in FIG. 33, the configuration information includes one RV sequence and an offset parameter, and for determining, based the configuration information, a respective RV value for each of the transmission occasions in response to the terminal sending the same TB repeatedly on the transmission occasions towards the different directions of TRPs, the apparatus further includes: a third mapping module 3301.

The third mapping module 3301 is configured to map RV values included in the RV sequence cyclically to transmission occasions of the CG PUSCH configuration; or, map the RV values included in the RV sequence cyclically to the transmission occasions towards the different directions of TRPs.

Figure 34:
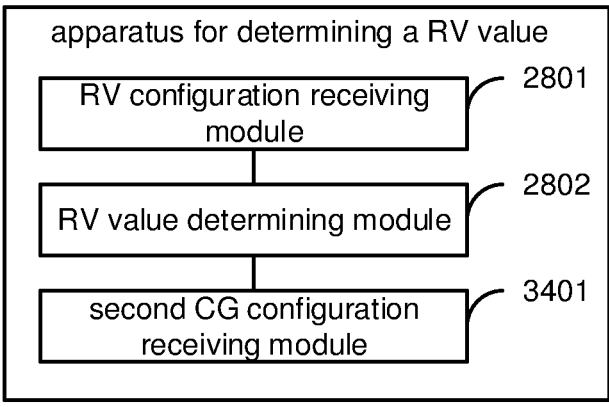
FIG. 34 is a block diagram illustrating yet another apparatus for determining a RV value according to an embodiment of the disclosure.

FIG. 34 is a schematic diagram illustrating yet another apparatus for determining a RV value according to an embodiment of the disclosure. As illustrated in FIG. 34, the apparatus further includes: a second CG configuration receiving module 3401.

The second CG configuration receiving module 3401 is configured to receive a plurality of CG PUSCH configurations sent by the base station, in which the transmission occasions on which the terminal repeatedly sends the same TB towards the different directions of TRPs belong to different CG PUSCH configurations of the plurality of CG PUSCH configurations.

In an embodiment, the configuration information includes a plurality of RV sequences that are configured for each CG PUSCH configuration of the plurality of CG PUSCH configurations respectively, or the configuration information includes one RV sequence configured for the plurality of CG PUSCH configurations, or the configuration information includes one RV sequence and an offset parameter configured for the plurality of CG PUSCH configurations.

Figure 35:
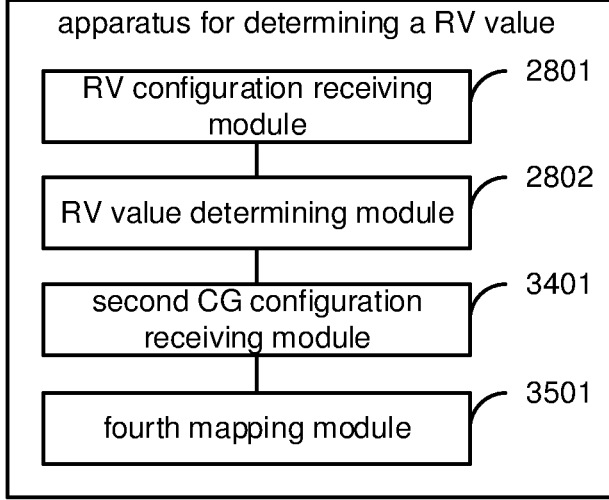
FIG. 35 is a block diagram illustrating yet another apparatus for determining a RV value according to an embodiment of the disclosure.

FIG. 35 is a schematic diagram illustrating yet another apparatus for determining a RV value according to an embodiment of the disclosure. As illustrated in FIG. 35, for determining, based on the configuration information, a respective RV value for each of the transmission occasions in response to the terminal sending the same TB repeatedly on the transmission occasions towards different directions of TRPs, the apparatus further includes: a fourth mapping module 350.

The fourth mapping module 3501 is configured to map RV values included in each RV sequence cyclically to transmission occasions of a CG PUSCH configuration corresponding to the RV sequence.

Figure 36:
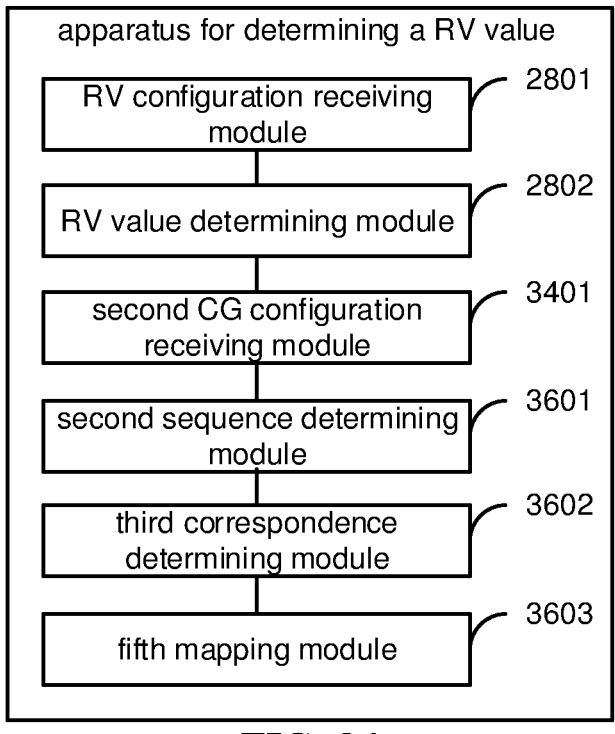
FIG. 36 is a block diagram illustrating yet another apparatus for determining a RV value according to an embodiment of the disclosure.

FIG. 36 is a schematic diagram illustrating yet another apparatus for determining a RV value according to an embodiment of the disclosure. As illustrated in FIG. 36, the configuration information includes one RV sequence and an offset parameter configured for the plurality of CG PUSCH configurations, and for determining, based on the configuration information, a respective RV value for each of the transmission occasions in response to the terminal sending the same TB repeatedly on the transmission occasions towards different directions of TRPs, the apparatus further includes: a second sequence determining module 3601, a third correspondence determining module 3602 and a fifth mapping module 3603.

The second sequence determining module 3601 is configured to determine a plurality of RV sequences containing the RV sequence based on the RV sequence and the offset parameter.

The third correspondence determining module 3602 is configured to determine a respective RV sequence corresponding to each CG PUSCH configuration in the plurality of CG PUSCH configurations.

The fifth mapping module 3603 is configured to map RV values in each RV sequence cyclically to transmission occasions of a corresponding CG PUSCH configuration.

Figure 37:
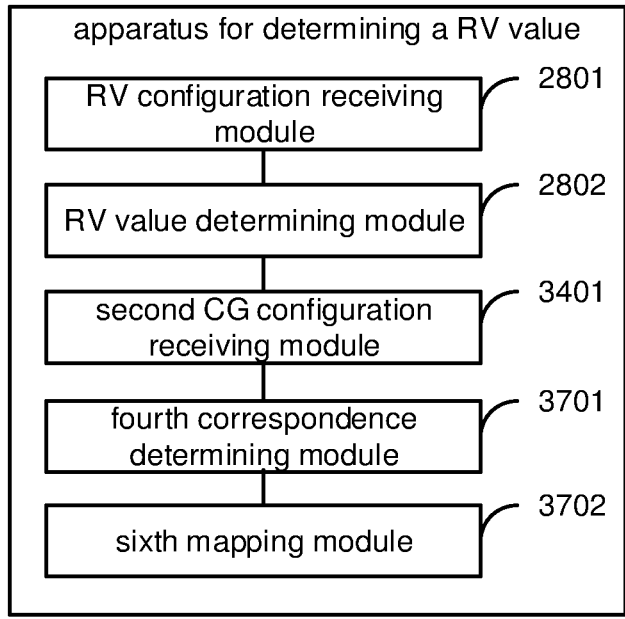
FIG. 37 is a block diagram illustrating yet another apparatus for determining a RV value according to an embodiment of the disclosure.

FIG. 37 is a schematic diagram illustrating yet another apparatus for determining a RV value according to an embodiment of the disclosure. As illustrated in FIG. 37, the configuration information includes one RV sequence configured for the plurality of CG PUSCH configurations, and for determining, based on the configuration information, a respective RV value for each of the transmission occasions in response to the terminal sending the same TB repeatedly on the transmission occasions towards different directions of TRPs, the apparatus further includes: a fourth correspondence determining module 3701 and a sixth mapping module 3702.

The fourth correspondence determining module 3701 is configured to determine a respective RV sequence corresponding to each CG PUSCH configuration of the plurality of CG PUSCH configurations.

The sixth mapping module 3702 is configured to map RV values included in each RV sequence cyclically to transmission occasions of a corresponding CG PUSCH configuration.

In an embodiment, the configuration information is carried in a RRC signaling.

In an embodiment, the RRC signaling contains a plurality of first indication messages related to RV sequences, and the plurality of first indication messages indicate the plurality of RV sequences respectively; or the RRC signaling contains a second indication message related to RV sequences, and the second indication message is configured to indicate the plurality of RV sequences.

Figures 38, 39:
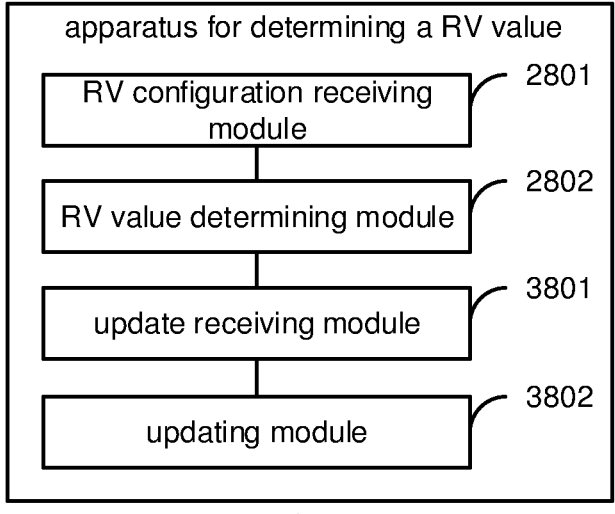
FIG. 38 is a block diagram illustrating yet another apparatus for determining a RV value according to an embodiment of the disclosure.
FIG. 39 is a schematic diagram illustrating a device for sending configuration information according to an embodiment of the disclosure.

FIG. 38 is a schematic diagram illustrating yet another apparatus for determining a RV value according to an embodiment of the disclosure. As illustrated in FIG. 38, the apparatus further includes: an update receiving module 3801 and an updating module 3802.

The update receiving module 3801 is configured to receive an update message of updating a RV sequence sent by the base station.

The updating module 3802 is configured to update, based on the update message, a respective RV sequence used for sending the same TB repeatedly on the transmission occasions corresponding to a CG PUSCH configuration towards each of the different directions of TRPs.

In an embodiment, the update message is carried in at least one of: DCI or a MAC-CE.

In an embodiment, the transmission occasions are nominal transmission occasions for the terminal to send the TB.

In an embodiment, the transmission occasions are actual transmission occasions for the terminal to send the TB.

In an embodiment, the transmission occasion is a transmission occasion that is not discarded due to a conflict among the actual transmission occasions for the terminal to send the TB.

In an embodiment, the method includes: starting cyclically mapping from a first RV value included in the RV sequence; or starting cyclically mapping from a RV value equaling to 0 included in the RV sequence.

With respect to the apparatus in the above embodiments, the specific manner in which each module performs an operation has been described in detail in embodiments of the relevant methods, and will not be described in detail herein.

The apparatus embodiments basically correspond to the method embodiments, the related contents can refer to part of the descriptions of the method embodiments. The above-described apparatus embodiments are merely schematic, the units described above as separate components may or may not be physically separated, and the components displayed as units may or may not be physical units, i.e., the components may be located in one area or may be distributed to multiple network units. Some or all of these modules can be selected based on practical needs to achieve the purpose of the solution of the disclosure. Those skilled in the art can understand and implement the solution without inventive works.

Embodiments of the disclosure also provide a communication device, including a processor and a memory for storing a computer program. When the computer program is executed by the processor, the method for sending configuration information of any embodiment is performed.

Embodiments of the disclosure also provide a communication device, including a processor and a memory for storing a computer program. When the computer program is executed by the processor, the method for determining a RV value of any embodiment is performed.

Embodiments of the disclosure also provide a computer-readable storage medium for storing a computer program. When the computer program is executed by a processor, the steps of the method for sending configuration information of any embodiment are performed.

Embodiments of the disclosure also provide a computer-readable storage medium for storing a computer program. When the computer program is executed by a processor, the steps of the method for determining a RV value of any embodiment are performed.

FIG. 39 is a schematic diagram illustrating a device 3900 for sending configuration information according to an embodiment of the disclosure. As illustrated in FIG. 39, the device 3900 may be provided as a base station. As illustrated in FIG. 39, the device 3900 includes a processing component 3922, a wireless transmit/receive component 3924, an antenna component 3926, and a signal processing portion specific to wireless interfaces. The processing component 3922 may further include one or more processors. One of the processors in the processing component 3922 may be configured to implement the method for sending configuration information as described in any of the above embodiments.

Figure 40:
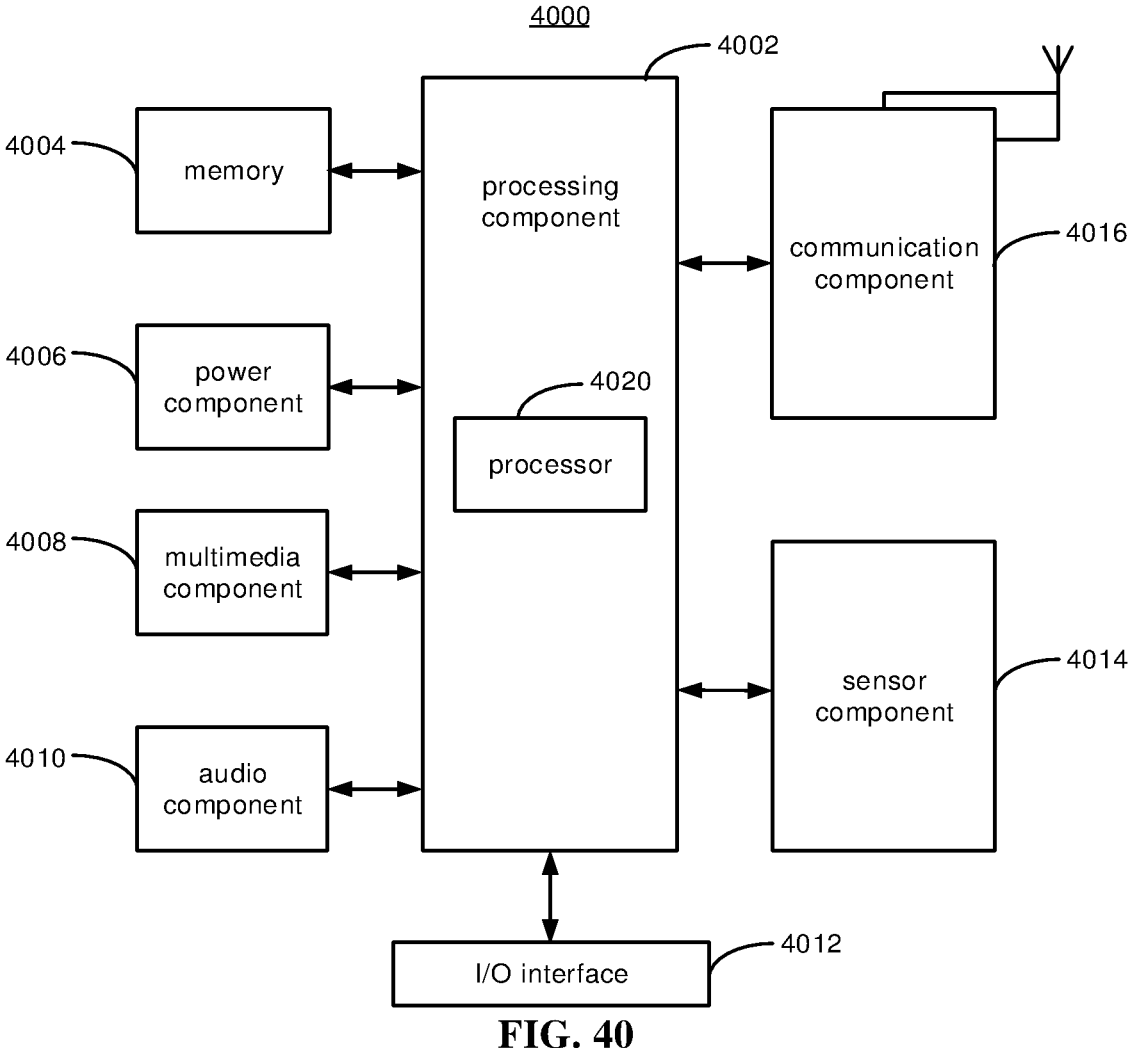
FIG. 40 is a schematic diagram illustrating a device for determining a RV value according to an embodiment of the disclosure.

FIG. 40 is a schematic diagram illustrating a device 4000 for determining a RV value according to an embodiment of the disclosure. For example, the device 4000 may be a mobile phone, a computer, a digital broadcasting terminal, a message transceiver device, a game console, a tablet device, a medical device, a fitness device and a personal digital assistant.

As illustrated in FIG. 40, the device 4000 may include one or more of the following components: a processing component 4002, a memory 4004, a power component 4006, a multimedia component 4008, an audio component 4010, an input/output (I/O) interface 4012, a sensor component 4014, and a communication component 4016.

The processing component 4002 typically controls overall operations of the device 4000, such as the operations associated with display, telephone calls, data communications, camera operations, and recording operations. The processing component 4002 may include one or more processors 4020 to execute instructions to implement all or part of the steps in the above described method for determining a RV value. Moreover, the processing component 4002 may include one or more modules which facilitate the interaction between the processing component 4002 and other components. For example, the processing component 4002 may include a multimedia module to facilitate the interaction between the multimedia component 4008 and the processing component 4002.

The memory 4004 is configured to store various types of data to support the operation of the device 4000. Examples of such data include instructions for any applications or methods operated on the device 4000, contact data, phone-book data, messages, pictures, video, etc. The memory 4004 may be implemented using any type of volatile or non-volatile memory devices, or a combination thereof, such as a Static Random-Access Memory (SRAM), an Electrically-Erasable Programmable Read Only Memory (EEPROM), an Erasable Programmable Read Only Memory (EPROM), a Programmable Read Only Memory (PROM), a Read Only Memory (ROM), a magnetic memory, a flash memory, a magnetic or optical disk.

The power component 4006 provides power to various components of the device 4000. The power component 4006 may include a power management system, one or more power sources, and any other components associated with the generation, management, and distribution of power in the device 4000.

The multimedia component 4008 includes a screen providing an output interface between the device 4000 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensor may not only sense a boundary of a touch or swipe action, but also sense a period of time and a pressure associated with the touch or swipe action. In some embodiments, the multimedia component 4008 includes a front-facing camera and/or a rear-facing camera. When the device 4000 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 4010 is configured to output and/or input audio signals. For example, the audio component 4010 includes a microphone (MIC) configured to receive an external audio signal when the device 4000 is in an operation mode, such as a call mode, a recording mode, and a voice recognition mode. The received audio signal may be further stored in the memory 4004 or transmitted via the communication component 4016. In some embodiments, the audio component 4010 further includes a speaker to output audio signals.

The I/O interface 4012 provides an interface between the processing component 4002 and peripheral interface modules, such as a keyboard, a click wheel, buttons, and the like. The buttons may include, but are not limited to, a home button, a volume button, a starting button, and a locking button.

The sensor component 4014 includes one or more sensors to provide status assessments of various aspects of the device 4000. For instance, the sensor component 4014 may detect an open/closed status of the device 4000, relative positioning of components, e.g., the display and the keypad, of the device 4000, a change in position of the device 4000 or a component of the device 4000, a presence or absence of user contact with the device 4000, an orientation or an acceleration/deceleration of the device 4000, and a change in temperature of the device 4000. The sensor component 4014 may include a proximity sensor configured to detect the presence of nearby objects without any physical contact. The sensor component 4014 may also include a light sensor, such as a Complementary Metal Oxide Semiconductor (CMOS) or Charge-Coupled Device (CCD) image sensor, for use in imaging applications. In some embodiments, the sensor component 4014 may also include an accelerometer sensor, a gyroscope sensor, a magnetic sensor, a pressure sensor, or a temperature sensor.

The communication component 4016 is configured to facilitate communication, wired or wirelessly, between the device 4000 and other devices. The device 4000 can access a wireless network based on a communication standard, such as Wi-Fi, 2G or 3G, 4G LTE, 5G NR or a combination thereof. In an embodiment, the communication component 4016 receives a broadcast signal or broadcast associated information from an external broadcast management system via a broadcast channel. In an embodiment, the communication component 4016 further includes a Near Field Communication (NFC) module to facilitate short-range communication. For example, the NFC module may be implemented based on a RF Identification (RFID) technology, an Infrared Data Association (IrDA) technology, an Ultra-Wide Band (UWB) technology, a Blue Tooth (BT) technology, and other technologies.

In embodiments, the device 4000 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, for performing the above described method for determining a RV value.

In an embodiment, there is also provided a non-transitory computer readable storage medium including executable instructions, such as the memory 4004. The above instructions may be executed by the processor 4020 in the device 4000, for performing the above method for determining a RV value. For example, the non-transitory computer-readable storage medium may be a ROM, a Random Access Memory (RAM), a CD-ROM, a magnetic tape, a floppy disc, and an optical data storage device.

According to embodiments of the disclosure, the base station sends the configuration information to the terminal. The configuration information may, on the one hand, be used by the terminal to determine the respective RV value for each of the transmission occasions in response to the terminal repeatedly sends the same TB on the transmission occasions towards the different directions of the TRPs, so that the terminal is able to perform rate matching based on the corresponding RV value of each transmission occasion. The configuration information may, on the other hand, be used by the base station to determine the respective RV value for each of the transmission occasions in response to the terminal repeatedly sending the same TB on the transmission occasions towards the different directions of the TRPs, such that the base station is able to perform rate matching using corresponding RV values when receiving a TB sent by the terminal, for reception and decoding.

Other embodiments of the disclosure will be apparent to those skilled in the art from consideration of the specification and practice of the disclosure disclosed here. The disclosure is intended to cover any variations, uses, or adaptations of the embodiments of the disclosure following the general principles thereof and including such departures from the disclosure as come within known or customary practice in the art. It is intended that the specification and embodiments are considered as examples only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

It should be noted that the relational terms herein, such as "first" and "second", are used only for differentiating one entity or operation, from another entity or operation, which, however do not necessarily require or imply that there should be any real relationship or sequence. Moreover, the terms "comprise", "include" or any other variations thereof are meant to cover non-exclusive including, so that the process, method, article or device comprising a series of elements do not only comprise those elements, but also comprise other elements that are not explicitly listed or also comprise the inherent elements of the process, method, article or device. In the case that there are no more restrictions, an element qualified by the statement "comprises a . . . " does not exclude the presence of additional identical elements in the process, method, article or device that comprises the said element.

The above detailed description of the methods and devices provided by the embodiments of the disclosure is provided herein, and specific examples are used herein to illustrate the principles and implementations of the disclosure, and the above illustrations of the embodiments are only used to assist in the understanding of the methods of the disclosure and the core ideas thereof. Meanwhile, for those skilled in the art, based on the ideas of the disclosure, there will be changes in the specific implementations and the usage scope, and in summary, the contents of the specification should not be construed as a limitation on the disclosure.

What is claimed is:

1. A method for sending configuration information, performed by a base station, wherein the base station is provided with a plurality of Transmission and Reception Points (TRPs) for receiving a Configured Grant Physical Uplink Shared Channel (CG PUSCH), and the method comprising:

sending configuration information to a terminal, wherein the configuration information is configured to determine a respective Redundancy Version (RV) value for each of transmission occasions in response to the terminal sending a same Transport Block (TB) repeatedly on the transmission occasions towards different directions of TRPs, and the transmission occasions belong to one or more CG PUSCH configurations, and sending one CG PUSCH configuration to the terminal;

wherein the transmission occasions on which the terminal repeatedly sends the same TB towards the different directions of TRPs belong to a same CG PUSCH configuration; and wherein the configuration information comprises one RV sequence and an offset parameter, and the method further comprises:

determining a plurality of RV sequences containing the RV sequence based on the RV sequence and the offset parameter;

dividing the transmission occasions of the CG PUSCH configuration into groups based on the directions of TRPs and a beam mapping rule, to determine a respective transmission occasion group corresponding to each of the directions of TRPs;

determining a respective RV sequence corresponding to each of the transmission occasion groups; and mapping RV values included in each RV sequence cyclically to transmission occasions included in a corresponding transmission occasion group.

2. The method of claim 1, further comprising:

receiving the same TB repeatedly sent by the terminal on the transmission occasions towards the different directions of TRPs.

3. The method of claim 1, wherein the configuration information comprises a plurality of RV sequences, or one RV sequence;

wherein the configuration information comprises the plurality of RV sequences, and the method further comprises: dividing the transmission occasions of the CG PUSCH configuration into groups based on the directions of TRPs and a beam mapping rule, to determine a respective transmission occasion group corresponding to each of the directions of TRPs; determining a respective RV sequence corresponding to each of the transmission occasion groups; and mapping RV values included in each RV sequence cyclically to transmission occasions included in a corresponding transmission occasion group; or wherein the configuration information comprises one RV sequence, and the method further comprises: mapping RV values included in the RV sequence cyclically to the transmission occasions of the CG PUSCH configuration or mapping the RV values included in the RV sequence cyclically to the transmission occasions towards the different directions of TRPs.

4. The method of claim 3, further comprising:

starting cyclically mapping from a first RV value included to the RV sequence; or starting cyclically mapping from a RV value equaling to 0 included in the RV sequence.

5. The method of claim 1, further comprising:

sending a plurality of CG PUSCH configurations to the terminal;

wherein the transmission occasions on which the terminal repeatedly sends the same TB towards different directions of TRPs belong to different CG PUSCH configurations of the plurality of CG PUSCH configurations;

wherein the configuration information comprises a plurality of RV sequences that are configured for the plurality of CG PUSCH configurations respectively, or the configuration information comprises one RV sequence configured for the plurality of CG PUSCH configurations, or the configuration information comprises one RV sequence and an offset parameter configured for the plurality of CG PUSCH configurations;

wherein the configuration information comprises the plurality of RV sequences, and the method further comprises: cyclically mapping RV values included in each RV sequence to transmission occasions of a respective CG PUSCH configuration corresponding to the RV sequence; or wherein the configuration information comprises one RV sequence and the offset value configured for the plurality of CG PUSCH configurations, and the method further comprises: determining a plurality of RV sequences containing the RV sequence based on the RV sequence and the offset parameter; determining a respective RV sequence corresponding to each of the plurality of CG PUSCH configurations; and mapping RV values included in each RV sequence cyclically to transmission occasions of a corresponding CG PUSCH configuration; or wherein the configuration information comprises one RV sequence configured for the plurality of CG PUSCH configurations, and the method further comprises:

determining a respective RV sequence corresponding to each CG PUSCH configuration of the plurality of CG PUSCH configurations; and mapping RV values included in each RV sequence cyclically to transmission occasions of a corresponding CG PUSCH configuration.

6. The method of claim 1, wherein the configuration information is carried in a Radio Resource Control (RRC) signaling;

wherein the RRC signaling contains a plurality of first indication messages related to RV sequences, and the plurality of first indication messages are configured to indicate a plurality of RV sequences; or the RRC signaling contains a second indication message related to RV sequences, and the second indication message is configured to indicate a plurality of RV sequences.

7. The method of claim 1, further comprising:

sending an update message of mapping a RV sequence to the terminal, wherein the update message is configured to instruct the terminal to update a respective RV sequence used for sending the same TB repeatedly on the transmission occasions corresponding to a CG PUSCH configuration towards each of the different directions of TRPs, wherein the update message is carried in at least one of: Downlink Control Information (DCI) or a Media Access Control Control Element (MAC-CE).

8. The method of claim 1, wherein the transmission occasions are nominal transmission occasions for the terminal to send the TB; or wherein the transmission occasions are actual transmission occasions for the terminal to send the TB; or wherein the transmission occasions include a transmission occasion that is not discarded due to a conflict among actual transmission occasions for the terminal to send the TB.

9. A non-transitory computer-readable storage medium for storing a computer program, wherein when the computer program is executed by a processor, the method of claim 1 is performed.

10. A method for determining a Redundancy Version (RV) value, performed by a terminal, comprising:

receiving configuration information sent by a base station;

determining, based on the configuration information, a respective RV value for each of transmission occasions in response to the terminal sending a same Transport Block (TB) repeatedly on the transmission occasions towards different directions of Transmission and Reception Points (TRPs), wherein the transmission occasions belong to one or more Configured Grant Physical Uplink Shared Channel (CG PUSCH) configurations; and receiving one CG PUSCH configuration sent by the base station;

wherein the transmission occasions on which the terminal repeatedly sends the same TB towards the different directions of TRPs belong to a same CG PUSCH configuration; and wherein the configuration information comprises one RV sequence and an offset parameter, and determining, based on the configuration information, the respective RV value for each of the transmission occasions in response to the terminal sending the same TB repeatedly on the transmission occasions towards the different directions of TRPs comprises:

determining a plurality of RV sequences containing the RV sequence based on the RV sequence and the offset parameter;

dividing the transmission occasions of the CG PUSCH configuration into groups based on the directions of TRPs and a beam mapping rule, to determine a respective transmission occasion group corresponding to each of the directions of TRPs;

determining a respective RV sequence corresponding to each of the transmission occasion groups; and mapping RV values included in each RV sequence cyclically to transmission occasions included in a corresponding transmission occasion group.

11. The method of claim 10, further comprising:

sending the same TB repeatedly on the transmission occasions towards the different directions of TRPs.

12. The method of claim 10, wherein the configuration information comprises a plurality of RV sequences, or the configuration information comprises one RV sequence;

wherein the configuration information comprises the plurality of RV sequences, and determining, based on the configuration information, the respective RV value for each of the transmission occasions in response to the terminal sending the same TB repeatedly on the transmission occasions towards the different directions of TRPs comprises: dividing the transmission occasions of the CG PUSCH configuration into groups based on the directions of TRPs and a beam mapping rule, to determine a respective transmission occasion group corresponding to each of the directions of TRPs; determining a respective RV sequence corresponding to each of the transmission occasion groups; and mapping RV values included in each RV sequence cyclically to transmission occasions included in a corresponding transmission occasion group; or wherein the configuration information comprises one RV sequence, and determining, based on the configuration information, the respective RV value for each of the transmission occasions in response to the terminal sending the same TB repeatedly on the transmission occasions towards the different directions of TRPs comprises: mapping RV values included in the RV sequence cyclically to transmission occasions of the CG PUSCH configuration or mapping the RV values included in the RV sequence cyclically to the transmission occasions towards the different directions of TRPs.

13. The method of claim 12, further comprising:

starting cyclically mapping from a first RV value included in the RV sequence; or starting cyclically mapping from a RV value equaling to 0 included in the RV sequence.

14. The method of claim 10, further comprising:

receiving a plurality of CG PUSCH configurations sent by the base station;

wherein the transmission occasions on which the terminal repeatedly sends the same TB towards the different directions of TRPs belong to different CG PUSCH configurations of the plurality of CG PUSCH configurations;

wherein the configuration information comprises a plurality of RV sequences that are configured for the plurality of CG PUSCH configurations respectively, or the configuration information comprises one RV sequence configured for the plurality of CG PUSCH configurations, or the configuration information comprises one RV sequence and an offset parameter configured for the plurality of CG PUSCH configurations;

wherein determining, based on the configuration information, the respective RV value for each of the transmission occasions in response to the terminal sending the same TB repeatedly on the transmission occasions towards the different directions of TRPs comprises: mapping RV values included in each RV sequence cyclically to transmission occasions of a respective CG PUSCH configuration corresponding to the RV sequence; or wherein the configuration information comprises one RV sequence and the offset parameter configured for the plurality of CG PUSCH configurations, and determining, based on the configuration information, the respective RV value for each of the transmission occasions in response to the terminal sending the same TB repeatedly on the transmission occasions towards the different directions of TRPs comprises: determining a plurality of RV sequences containing the RV sequence based on the RV sequence and the offset parameter; determining a respective RV sequence corresponding to each CG PUSCH configuration in the plurality of CG PUSCH configurations; and mapping RV values included in each RV sequence cyclically to transmission occasions of a corresponding CG PUSCH configuration; or wherein the configuration information comprises one RV sequence configured for the plurality of CG PUSCH configurations, and determining, based on the configuration information, the respective RV value for each of the transmission occasions in response to the terminal sending the same TB repeatedly on the transmission occasions towards the different directions of TRPs comprises: determining a respective RV sequence corresponding to each CG PUSCH configuration of the plurality of CG PUSCH configurations; and mapping RV values included in each RV sequence cyclically to transmission occasions of a corresponding CG PUSCH configuration.

15. The method of claim 10, wherein the configuration information is carried in a Radio Resource Control (RRC) signaling, wherein the RRC signaling contains a plurality of first indication messages related to RV sequences, and the plurality of first indication messages are configured to indicate a plurality of RV sequences; or the RRC signaling contains a second indication message related to RV sequences, and the second indication message is configured to indicate a plurality of RV sequences.

16. The method of claim 10, further comprising:

receiving an update message of mapping a RV sequence sent by the base station; and updating, based on the update message, a respective RV sequence used for sending the same TB repeatedly on the transmission occasions corresponding to a CG PUSCH configuration towards each of directions of TRPs, wherein the update message is carried in at least one of: Downlink Control Information (DCI) or a Media Access Control Control Element (MAC-CE).

17. The method of claim 10, wherein the transmission occasions are nominal transmission occasions for the terminal to send the TB; or wherein the transmission occasions are actual transmission occasions for the terminal to send the TB; or wherein the transmission occasions include a transmission occasion that is not discarded due to a conflict among actual transmission occasions for the terminal to send the TB.

18. A communication device, comprising:

a processor; and a memory for storing a computer program;

wherein the processor is configured to perform the method of claim 10.

19. A non-transitory computer-readable storage medium for storing a computer program, wherein when the computer program is executed by a processor, the method of claim 10 is performed.

20. A communication device, comprising:

a processor; and a memory for storing a computer program;

wherein the processor is configured to:

send configuration information to a terminal, wherein the configuration information is configured to determine a respective Redundancy Version (RV) value for each of transmission occasions in response to the terminal sending a same Transport Block (TB) repeatedly on the transmission occasions towards different directions of TRPs, and the transmission occasions belong to one or more CG PUSCH configurations; and send one CG PUSCH configuration to the terminal;

wherein the transmission occasions on which the terminal repeatedly sends the same TB towards the different directions of TRPs belong to a same CG PUSCH configuration; and wherein the configuration information comprises one RV sequence and an offset parameter, and the method further comprises:

determining a plurality of RV sequences containing the RV sequence based on the RV sequence and the offset parameter;

dividing the transmission occasions of the CG PUSCH configuration into groups based on the directions of TRPs and a beam mapping rule, to determine a respective transmission occasion group corresponding to each of the directions of TRPs;

determining a respective RV sequence corresponding to each of the transmission occasion groups; and mapping RV values included in each RV sequence cyclically to transmission occasions included in a corresponding transmission occasion group.

* * * * *